United States Patent
Chen et al.

(10) Patent No.: US 9,921,689 B2
(45) Date of Patent: Mar. 20, 2018

(54) INFORMATION PROCESSING METHOD, INFORMATION PROCESSING APPARATUS, AND STORAGE MEDIUM

(71) Applicant: FUJITSU LIMITED, Kawasaki-shi, Kanagawa (JP)

(72) Inventors: Bin Chen, Machida (JP); Yoshihiko Murakawa, Yokohama (JP); Yusuke Yasukawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 14/953,988

(22) Filed: Nov. 30, 2015

(65) Prior Publication Data
US 2016/0162057 A1 Jun. 9, 2016

(30) Foreign Application Priority Data
Dec. 4, 2014 (JP) .................... 2014-246238

(51) Int. Cl.
*G06F 3/033* (2013.01)
*G06F 3/042* (2006.01)
(Continued)

(52) U.S. Cl.
CPC ............ *G06F 3/0425* (2013.01); *G06T 7/277* (2017.01); *G06K 9/00201* (2013.01); *G06K 9/00355* (2013.01); *G06K 9/2018* (2013.01); *G06K 9/224* (2013.01); *G06K 9/3241* (2013.01); *G06K 9/4652* (2013.01); *G06K 9/68* (2013.01); *G06T 2207/10016* (2013.01); *G06T 2207/20076* (2013.01); *G06T 2207/30196* (2013.01); *G06T 2207/30241* (2013.01)

(58) Field of Classification Search
CPC ...... G06F 3/0416; G06F 3/03547; G06T 7/20
See application file for complete search history.

(56) References Cited

U.S. PATENT DOCUMENTS

2004/0071317 A1* 4/2004 Pavlovic .............. G06K 9/6297
382/103
2005/0104962 A1* 5/2005 Han .................... G06K 9/00335
348/143

(Continued)

FOREIGN PATENT DOCUMENTS

| JP | 2012-515966 | 7/2012 |
| JP | 2013-541088 | 11/2013 |

(Continued)

*Primary Examiner* — Jennifer Mehmood
*Assistant Examiner* — Sosina Abebe
(74) *Attorney, Agent, or Firm* — Staas & Halsey LLP

(57) ABSTRACT

An information processing method including: storing sequential data relating to movements of a target object over a specified plane, sequentially estimating a plurality of first likelihoods of a position of the target object in a direction of the specified plane based on the sequential data, each of the plurality of first likelihoods associating with each hypothesis on the movements of the target object, sequentially estimating a plurality of second likelihoods of touch of the target object on the specified plain based on the sequential data, each of the plurality of second likelihoods corresponding to each of the plurality of first likelihoods, and updating the plurality of first likelihoods based on the plurality of second likelihoods.

11 Claims, 19 Drawing Sheets

(51) Int. Cl.
*G06T 7/277* (2017.01)
*G06K 9/00* (2006.01)
*G06K 9/20* (2006.01)
*G06K 9/22* (2006.01)
*G06K 9/32* (2006.01)
*G06K 9/46* (2006.01)
*G06K 9/68* (2006.01)

(56) References Cited

U.S. PATENT DOCUMENTS

| | | | | |
|---|---|---|---|---|
| 2010/0220922 | A1* | 9/2010 | Okada | G06K 9/00375 |
| | | | | 382/159 |
| 2011/0279397 | A1 | 11/2011 | Rimon et al. | |
| 2012/0200522 | A1* | 8/2012 | Westhues | G06F 3/044 |
| | | | | 345/174 |
| 2014/0359515 | A1* | 12/2014 | Medlock | G06F 3/0237 |
| | | | | 715/773 |

FOREIGN PATENT DOCUMENTS

| | | |
|---|---|---|
| JP | 2014-504773 | 2/2014 |
| WO | WO 2012/034715 A1 | 3/2012 |

\* cited by examiner

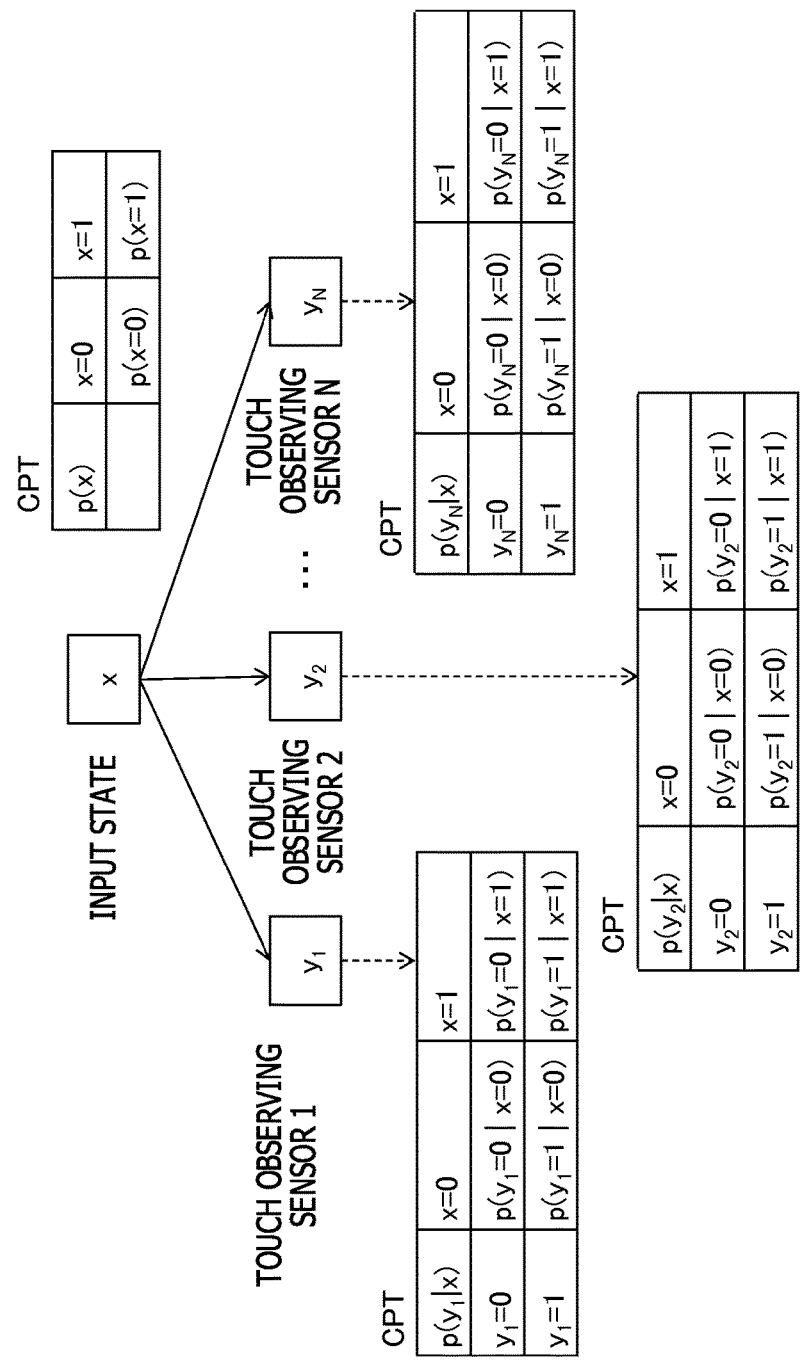

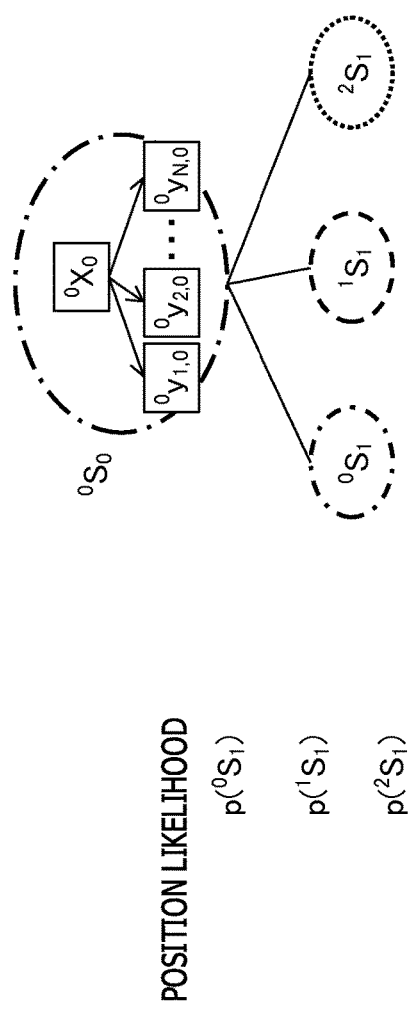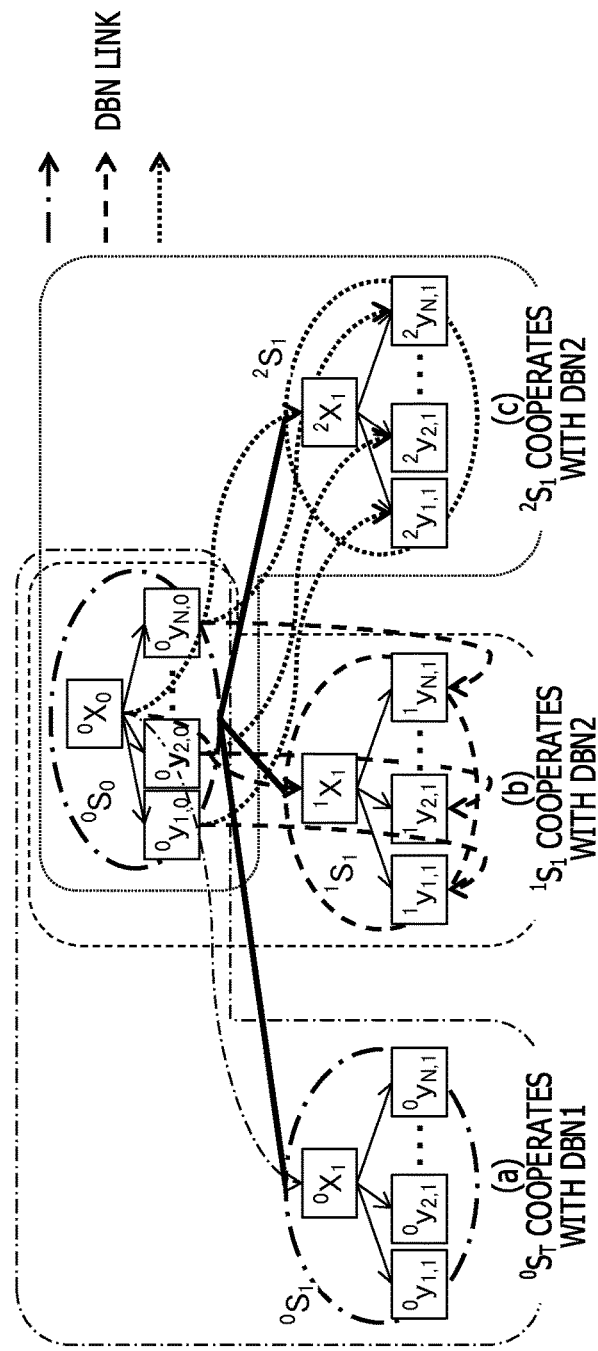
FIG. 8A
FIG. 8B

FIG. 10

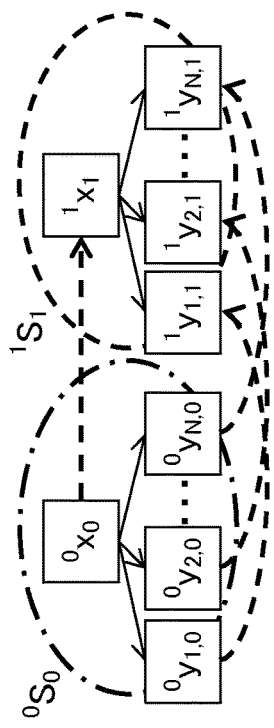

$$p(^1x_t = 1 \mid y_{1,0:t}, \ldots, y_{N,0:t}) \propto \underbrace{p(^1y_{1,t}, \ldots, ^1y_{N,t} \mid ^1x_t = 1)}_{\text{TOUCH OPERATION LIKELIHOOD}} \left[ \sum_{x_{t-1}=1,\ldots,N} \underbrace{p(^1x_t \mid ^0x_{t-1})}_{\substack{\text{OPERATION}\\\text{TRANSITION}\\\text{PROBABILITY}}} \underbrace{p(^0x_{t-1} \mid y_{1,0:t-1}, \ldots, y_{N,0:t-1})}_{\text{PREVIOUS OPERATION LIKELIHOOD}} \right] \quad \cdots \text{EQUATION (3)}$$

$$= \underbrace{p(^1y_{1,t}, \ldots, ^1y_{N,t} \mid ^1x_t = 1)}_{\text{SENSOR OBSERVATION LIKELIHOOD}}$$

$$\underbrace{p(^1s_t)}_{\substack{\text{PRESENT POSITION}\\\text{LIKELIHOOD AFTER UPDATING}}} = \underbrace{p(^1x_t = 1 \mid y_{1,0:t}, \ldots, y_{N,0:t})}_{\text{TOUCH OPERATION LIKELIHOOD}} \underbrace{p(^1s_t)}_{\substack{\text{PRESENT}\\\text{POSITION}\\\text{LIKELIHOOD}}} + \underbrace{p(^0s_{t-1})}_{\substack{\text{PREVIOUS}\\\text{POSITION}\\\text{LIKELIHOOD}}} \quad \cdots \text{EQUATION (4)}$$

FIG. 11

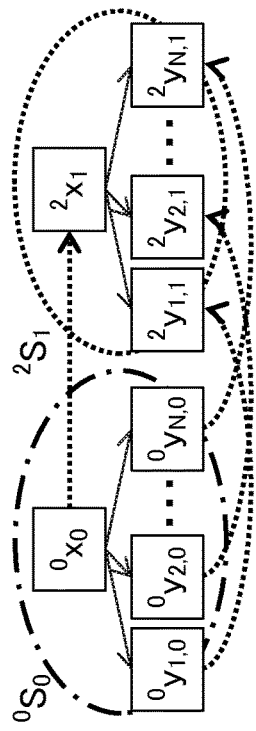

$$p(^2x_t = 0 | y_{1,0:t},...,y_{N,0:t}) \propto \underbrace{p(^2y_{1,t},...,y_{N,t} |^2 x_t = 0)}_{\text{SENSOR OBSERVATION LIKELIHOOD}} \left[ \sum_{x_{t-1}=1,...,N} \underbrace{p(^2x_t |^0 x_{t-1})}_{\substack{\text{OPERATION} \\ \text{TRANSITION} \\ \text{PROBABILITY}}} \underbrace{p(^0x_{t-1} | y_{1,0:t-1},...,y_{N,0:t-1})}_{\text{PREVIOUS OPERATION LIKELIHOOD}} \right]$$

$$\underbrace{\phantom{p(^2x_t = 0 | y_{1,0:t},...,y_{N,0:t})}}_{\text{HOVER OPERATION LIKELIHOOD}} \qquad \text{...EQUATION (5)}$$

$$\underbrace{p(^2s_t)}_{\substack{\text{PRESENT POSITION} \\ \text{LIKELIHOOD AFTER UPDATING}}} = \underbrace{p(^2x_t = 0 | y_{1,0:t},...,y_{N,0:t})}_{\text{HOVER OPERATION LIKELIHOOD}} \underbrace{p(^2s_t)}_{\substack{\text{PRESENT} \\ \text{POSITION} \\ \text{LIKELIHOOD}}} + \underbrace{p(^2s_{t-1})}_{\substack{\text{PREVIOUS} \\ \text{POSITION} \\ \text{LIKELIHOOD}}} \qquad \text{...EQUATION (6)}$$

FIG. 12A
FIG. 12B
CASE WHERE PARENT IS $^1S_{T-1}$
CASE WHERE PARENT IS $^2S_{T-1}$
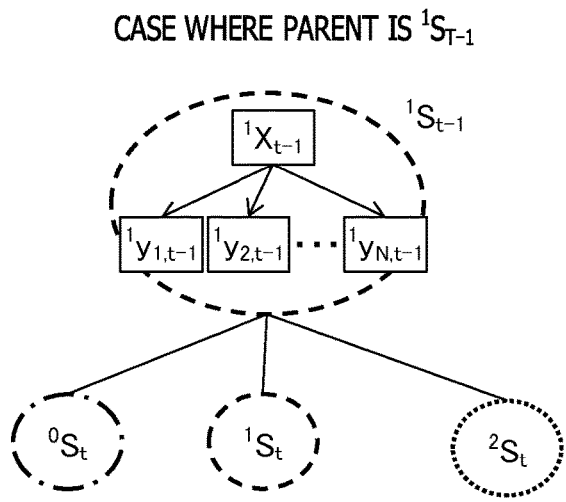
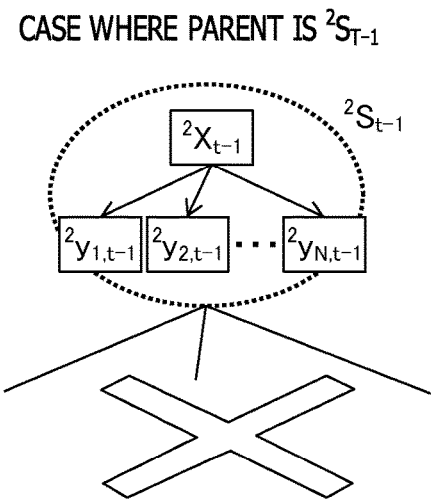

FIG. 17B

| ASSIGNED HYPOTHESES | CONTENTS | HYPOTHESIS LIKELIHOODS |
|---|---|---|
| $S_{t,1}$ | OBSERVATION DATA A IS CONSIDERED TO BE SIGNAL GENERATED FROM TARGET $S_{t-1}$. ACCORDING TO THIS HYPOTHESIS, TARGET POSITION $S_{t-1}$ IS UPDATED BY THIS OBSERVATION. | $p(S_{t,1})$ CALCULATION BASED ON MOTION MODEL |
| $S_{t,2}$ | OBSERVATION DATA B IS CONSIDERED TO BE SIGNAL GENERATED FROM TARGET $S_{t-1}$. ACCORDING TO THIS HYPOTHESIS, TARGET POSITION $S_{t-1}$ IS UPDATED BY THIS OBSERVATION. | $p(S_{t,2})$ CALCULATION BASED ON MOTION MODEL |
| $S_{t,3}$ | THERE IS CONSIDERED TO BE NO OBSERVATION DATA FOR TARGET $S_{t-1}$. ACCORDING TO THIS HYPOTHESIS, TARGET POSITION $S_{t-1}$ IS UPDATED BY PREDICTION ON BASIS OF MOVING SPEED THUS FAR OR THE LIKE. | $p(S_{t,3})$ CALCULATION BASED ON MOTION MODEL |
| $S_{t,4}$ | OBSERVATION DATA A IS CONSIDERED TO BE SIGNAL FROM COMPLETELY NEW TARGET. ACCORDING TO THIS HYPOTHESIS, TRACKING OF NEW TRAJECTORY IS STARTED. | $p(S_{t,4})$ CONSTANT SET IN ADVANCE |
| $S_{t,5}$ | OBSERVATION DATA A IS CONSIDERED TO BE NOISE AND ERROR ALARM. ACCORDING TO THIS HYPOTHESIS, OBSERVATION DATA CONCERNED IS IGNORED | $p(S_{t,5})$ CONSTANT SET IN ADVANCE |
| $S_{t,6}$ | DUMMY TRAJECTORY PROVIDED FOR CONVENIENCE OF CALCULATION | $p(S_{t,6})$ CONSTANT SET IN ADVANCE |
| $S_{t,7}$ | OBSERVATION DATA B IS CONSIDERED TO BE SIGNAL FROM COMPLETELY NEW TARGET. ACCORDING TO THIS HYPOTHESIS, TRACKING OF NEW TRAJECTORY IS STARTED. | $p(S_{t,7})$ CONSTANT SET IN ADVANCE |
| $S_{t,8}$ | OBSERVATION DATA B IS CONSIDERED TO BE NOISE AND ERROR ALARM. ACCORDING TO THIS HYPOTHESIS, OBSERVATION DATA CONCERNED IS IGNORED. | $p(S_{t,8})$ CONSTANT SET IN ADVANCE |
| $S_{t,9}$ | DUMMY TRAJECTORY PROVIDED FOR CONVENIENCE OF CALCULATION | $p(S_{t,9})$ CONSTANT SET IN ADVANCE |

FIG. 18

|  | CPU | CPU | CPU |
|---|---|---|---|
| OBSERVATION DATA A | $p(S_{t,1})$ | $p(S_{t,4})$ | – |
| OBSERVATION DATA B | $p(S_{t,2})$ | – | $p(S_{t,7})$ |
| DUMMY OBSERVATION (ERROR ALARM) | $p(S_{t,3})$ | $p(S_{t,5})$ | $p(S_{t,8})$ |
| DUMMY OBSERVATION | – | $p(S_{t,6})$ | $p(S_{t,9})$ |

INFORMATION PROCESSING METHOD, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2014-246238, filed on Dec. 4, 2014, the entire contents of which are incorporated herein by reference.

FIELD

The embodiments discussed herein are related to an information processing method, an information processing apparatus, and a storage medium.

BACKGROUND

There is for example a method of recognizing a pointer position touched by a pointer such as a finger of a user or a pointer device used by a user on the surface of a table, a wall, or the like present within a real space, a movement trajectory operation when the pointer moves while touching the surface, or the like from a camera or the like. Conventionally, the recognition of the touch operation of the above-described pointer and the tracking of the touch position are performed separately by respective different processing modules.

As the recognition of the touch operation of the pointer directed by the user, for example, there is a touch recognition method using dynamic Bayesian networks (DBNs). The DBN is a method for combining a plurality of kinds of sensor data and estimating a state. In addition, as a method for tracking the touch position, there is a tracking method using multiple hypothesis tracking (MHT), for example. The MHT enables robust tracking even when a plurality of pointers intersect each other or observation data is lost.

PRIOR ART DOCUMENTS

Patent Documents

[Patent Document 1] Japanese National Publication of International Patent Application No. 2012-515966
[Patent Document 2] Japanese National Publication of International Patent Application No. 2013-541088
[Patent Document 3] Japanese National Publication of International Patent Application No. 2014-504773

SUMMARY

According to an aspect of the invention, an information processing method includes storing sequential data relating to movements of a target object over a specified plane, sequentially estimating a plurality of first likelihoods of a position of the target object in a direction of the specified plane based on the sequential data, each of the plurality of first likelihoods associating with each hypothesis on the movements of the target object, sequentially estimating a plurality of second likelihoods of touch of the target object on the specified plane based on the sequential data, each of the plurality of second likelihoods corresponding to each of the plurality of first likelihoods, and updating the plurality of first likelihoods based on the plurality of second likelihoods.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are diagrams of assistance in explaining a simple Bayesian network (BN) in a pointer trajectory extracting unit;
FIGS. 8A and 8B are diagrams illustrating an example of addition of position hypothesis nodes;
FIG. 10 is a diagram illustrating an example of calculation of a touch operation likelihood $p(^1 x_1=1)$;
FIG. 11 is a diagram illustrating an example of calculation of a hover operation likelihood $p(^2 x_1=0)$;
FIGS. 12A and 12B are diagrams illustrating an example of generation of a trajectory tree;
FIGS. 17A and 17B are diagrams (1) illustrating an example of hypotheses in a case of a plurality of pointers;
and
FIG. 18 is a diagram (2) illustrating an example of hypotheses in a case of a plurality of pointers.

DESCRIPTION OF EMBODIMENTS

However, with the conventional method, the setting of a criterion for determining a touch operation depends on the empirical rule or tuning operation of each user. In addition, as described above, the recognition of the touch operation of a pointer and the tracking of the touch position are performed separately from each other. It is therefore difficult to extract for example a state in which the position of the pointer is separated from a touch surface (which state will hereinafter be referred to as a "hover state" when desired), and simultaneously extract a plurality of pointers whose pointer trajectories intersect each other. It is thus difficult to properly recognize the input state of an object (target) such as a pointer.

In one aspect, it is desirable to improve accuracy of input using an object such as a pointer.

An embodiment will hereinafter be described with reference to the drawings.

<Example of Functional Configuration of Information Processing Device>

Figure 1:
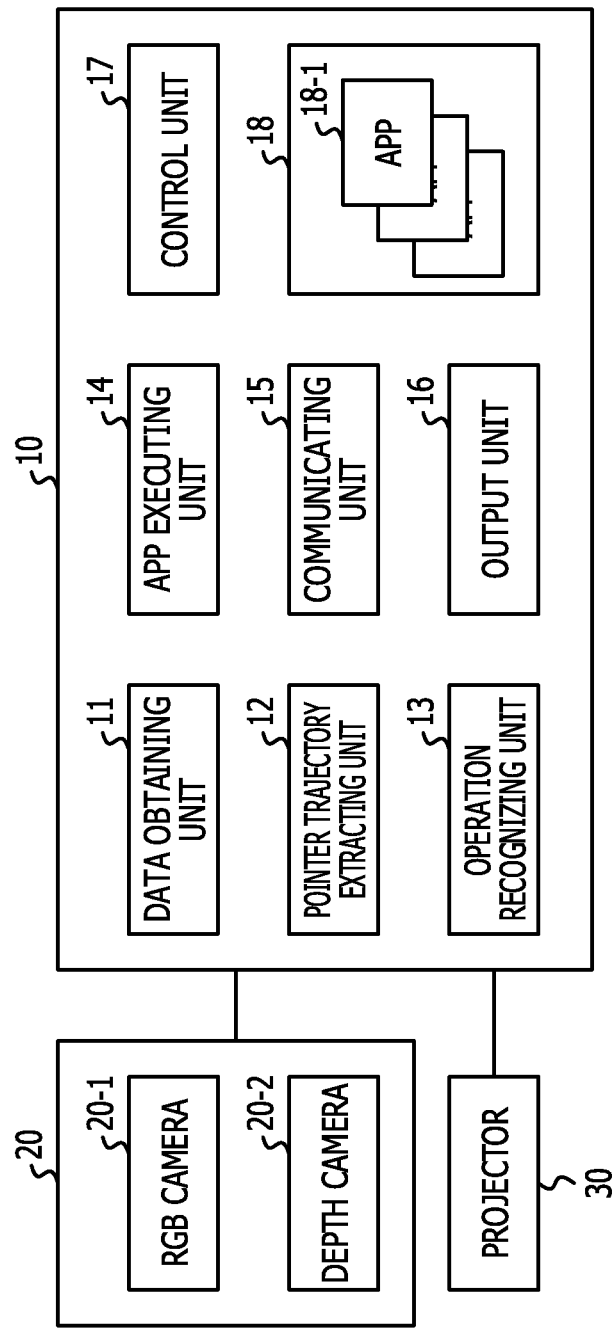
FIG. 1 is a diagram illustrating an example of functional configuration of an information processing device.

FIG. 1 is a diagram illustrating an example of functional configuration of an information processing device. The information processing device 10 illustrated in FIG. 1 includes a data obtaining unit 11, a pointer trajectory extracting unit (trajectory extracting unit) 12, an operation recognizing unit 13, an app executing unit 14, a communicating unit 15, an output unit 16, a control unit 17, and a storage unit 18. The information processing device 10 illustrated in FIG. 1 is coupled to an observing unit 20 and a projector 30.

The data obtaining unit 11 obtains data (sequential data) on the position and height of an object such as a pointer, the presence or absence of a touch of a given position (a table, a wall, or some plane) in a real space, and the like. The object is for example a fingertip of a user, the tip portion of an indicating member such as a touch pen, or the light receiving point (indicating point) of a laser emitted from a laser pointer such as a light pen. However, the object is not limited to this.

The data obtaining unit 11 for example obtains at least one piece of observation data or the like, which is obtained through the observing unit 20 or the like provided separately from the information processing device 10. The observation data is a pointer position (pointer candidate position), a height, information for determining whether or not a given surface (for example the top surface of a table or a wall) or the like is touched, and the like, which are obtained from the observing unit 20. However, the observation data is not limited to this.

In this case, the observing unit 20 illustrated in FIG. 1 includes an RGB camera 20-1 and a depth camera 20-2. However, the observing unit 20 is not limited to the RGB camera 20-1 and the depth camera 20-2, but may be provided with another sensor. The RGB camera 20-1 is for example a digital camera including a sensor such as a charge coupled device (CCD) or a complementary metal oxide semiconductor (CMOS) and filters of respective colors of RGB. The RGB camera 20-1 obtains video or the like including image frames at given time intervals. The data obtaining unit 11 obtains, from the observation data obtained from the RGB camera 20-1, for example the position of the pointer (pointer candidate position) and the presence or absence of illumination of a light emitting portion (for example a light emitting diode (LED)) that illuminates when the pointer touches a certain object.

The depth camera 20-2 for example performs depth detection using light such as infrared rays. For example, the depth camera 20-2 obtains reflected light information including the depth values of respective pixels by receiving light that is applied from a light emitting unit and reflected by an object. The data obtaining unit 11 obtains the height of the pointer or the like from the observation data obtained from the depth camera 20-2.

It is to be noted that the kinds of cameras included in the observing unit 20 are not limited to the RGB camera 20-1 and the depth camera 20-2, but may include one or a plurality of other sensors (observing sensors) or the like. For example, the observing unit 20 may be a combination of the RGB camera 20-1 and an ultrasonic wave sensor, may be a combination of the depth camera 20-2 and a monochrome camera, may be a combination of the ultrasonic wave sensor and the monochrome camera, or may be a combination of all of the above.

In addition, the observing unit 20 may observe the position and height of the pointer and the presence or absence of a touch (hereinafter referred to as "touch observation") together with an image of an icon, a mark, or the like projected from the output unit 16 onto a tabletop (top surface of a table) or a wall by a display unit such as the projector 30. Therefore, the information processing device 10 can for example recognize an operation by the operation recognizing unit 13 from a relation between the image of the icon or the like and the presence or absence of a touch on the image, and perform processing corresponding to the operation (for example a touch, a flick, or the like of the icon). In addition, at least one of the observing unit 20 and the projector 30 may be formed integrally with the information processing device 10.

The pointer trajectory extracting unit 12 obtains position information such as the position and height of the pointer by sensing (measuring) the position of the pointer at each time (sequentially) on the basis of each piece of information obtained by the data obtaining unit 11. In addition, the pointer trajectory extracting unit 12 obtains operation information by sensing (measuring) the operation of the pointer. In addition, the pointer trajectory extracting unit 12 generates a position hypothesis related to a candidate position of the pointer at each time (sequentially) on the basis of the obtained position information, and generates an operation hypothesis reflecting an operation in each position hypothesis on the basis of the obtained operation information. In addition, the pointer trajectory extracting unit 12 determines (estimates) a position hypothesis likelihood (position likelihood) and an operation hypothesis likelihood (operation likelihood) reflecting each operation and associated with the position hypothesis, and determines (extracts) the input state (pointer trajectory or the like) of the pointer on the basis of the position hypothesis likelihood and the operation hypothesis likelihood.

The pointer trajectory extracting unit 12 may for example manage the position hypothesis at each time by a tree (trajectory tree). The pointer trajectory extracting unit 12 generates the tree by adding, each time a position hypothesis is generated, the new position hypothesis as a node of the tree to an immediately preceding position hypothesis node. An input state such for example as a pointer trajectory can be determined by using the generated tree. In addition, the pointer trajectory extracting unit 12 may perform pruning of the tree (selection and deletion) on the basis of a hypothesis likelihood in which the position hypothesis likelihood and the operation hypothesis likelihood are integrated, and determine the input state of the pointer. The input state of the pointer may be for example a touch state or a hover state. The touch state is a state in which it is determined that for example a fingertip of the user or the tip portion of an indicating member is touching a given position (surface). The hover state is for example a state in which the pointer is in a given height range above a touch surface without touching a given position.

For example, the pointer trajectory extracting unit 12 may extract a position hypothesis related to a candidate position of the pointer by using a tracking algorithm (MHT) intended for simultaneous tracking of a plurality of pointers. In addition, the pointer trajectory extracting unit 12 may extract an operation hypothesis related to a candidate operation of the pointer by using a touch recognition (DBN).

The operation recognizing unit 13 recognizes operation contents indicated by the user or the like on the basis of the position and height of the pointer at each time (sequentially), a trajectory (tracking result), and the presence or absence of a touch, which are extracted by the pointer trajectory extracting unit 12. The operation contents include for example a touch, a drag, a flick, a long depression, and the like. However, the operation contents are not limited to this.

The app executing unit 14 performs processing associated with an app selected from one or a plurality of applications 18-1 (hereinafter abbreviated to "apps 18-1") stored in the storage unit 18. For example, the app executing unit 14 selects an app 18-1 on the basis of an operation (for example a user instruction or the like) recognized by the operation recognizing unit 13, and performs a corresponding operation for each selected app 18-1. The execution of an app is for example starting and ending of the app, output by the output unit 16 (for example projection display by the projector 30 or the like), a screen transition, enlarging, reduction, character input, editing, deletion, or the like. However, the execution of an app is not limited to this.

The communicating unit 15 for example transmits and receives data to and from an external device such as a server coupled to the communicating unit 15 via a communication network typified by the Internet, a local area network (LAN), or the like. The communication network may be a wired network or a wireless network, or may be a combination of wired and wireless networks.

The output unit 16 outputs given contents processed by the app 18-1 and various kinds of data on a display unit such as the projector 30. It is to be noted that the output destination of the various kinds of data and the like output from the output unit 16 is not limited to the projector 30, but that the various kinds of data and the like may be output to another external device or the like coupled via the communicating unit 15.

The control unit 17 controls each of the constituent units included in the information processing device 10. For example, the control unit 17 controls the obtainment of observation data by the data obtaining unit 11, the extraction of the position, height, trajectory, and the like of the pointer by the pointer trajectory extracting unit 12, the recognition of a pointer operation by the operation recognizing unit 13, and the like. In addition, the control unit 17 controls the execution of the app 18-1 by the app executing unit 14, the transmission and reception of data by the communicating unit 15, data output to the projector 30 or the like by the output unit 16, and the like.

The contents of control by the control unit 17 are not limited to this. The control unit 17 may for example control starting and ending of input control processing in the present embodiment, error processing, and the like. In addition, the control unit 17 may for example control the observing unit 20, the projector 30, and the like.

The storage unit 18 reads and writes various kinds of information involved in the input control processing in the present embodiment. The storage unit 18 for example stores one or a plurality of apps 18-1 to be executed by the app executing unit 14. These apps 18-1 can be obtained by a download or the like from an external device or the like coupled to the communicating unit 15 via the communication network or the like, and can be used after being installed on the information processing device 10. It is to be noted that the information stored in the storage unit 18 is not limited to the apps 18-1, but that for example a conditional probability table (CPT) to be described later and the like may be stored in the storage unit 18. In addition, the storage unit 18 may store information on a user using the information processing device 10, a display message to be displayed at a time of a pointer input error, a log of input information, and the like.

The information processing device 10 may be for example a personal computer (PC), a server, or the like, or may be a smart phone, a tablet terminal, or the like.

<Example of Hardware Configuration>

Figure 2:
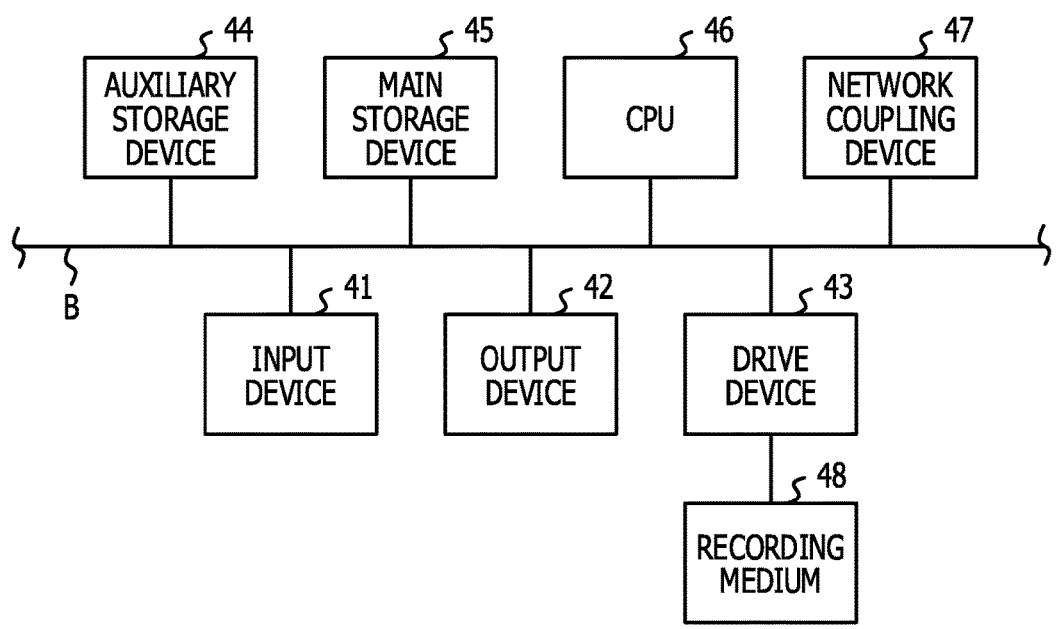
FIG. 2 is a diagram illustrating an example of hardware configuration.

An example of hardware configuration of a computer such as an information processing device will next be described with reference to a drawing. FIG. 2 is a diagram illustrating an example of hardware configuration. The hardware configuration depicted in FIG. 2 may be a hardware configuration of the information processing device 10 depicted in FIG. 1. In the example of FIG. 2, the information processing device 10 includes an input device 41, an output device 42, a drive device 43, an auxiliary storage device 44, a main storage device 45, a central processing unit (CPU) 46, and a network coupling device 47. These constituent elements are coupled to one another via a system bus B.

The input device 41 includes pointing devices such as a keyboard and a mouse operated by the user or the like and an audio input device such as a microphone. The input device 41 receives input such as an instruction to execute a program, various kinds of operation information, and information for starting software or the like from the user or the like. In addition, as the above-described data obtaining unit 11, the input device 41 may obtain observation data from the observing unit 20 or the like.

The output device 42 includes a display or the like for displaying various kinds of windows, data, and the like that may be necessary to operate a computer main unit (information processing device 10) configured to perform processing in the present embodiment. The output device 42 can display progress or a result of execution of a program or the like according to a control program possessed by the CPU 46. In addition, as the above-described output unit 16, the output device 42 may output data using a display unit such as the projector 30.

The drive device 43 reads various kinds of data recorded on a recording medium 48 or the like, and writes various kinds of data to the recording medium 48. In this case, in the present embodiment, for example an execution program to be installed onto the computer main unit such as the information processing device 10 is provided by the recording medium 48 or the like. The recording medium 48 can be set in the drive device 43. On the basis of a control signal from the CPU 46, the execution program stored on the recording medium 48 is installed from the recording medium 48 into the auxiliary storage device 44 via the drive device 43.

The auxiliary storage device 44 is for example a storage device such as a hard disk drive (HDD) or a solid state drive (SSD). The auxiliary storage device 44 stores an execution program (input control program) in the present embodiment, a control program provided to the computer, and the like on the basis of a control signal from the CPU 46, and performs input and output when desired. The auxiliary storage device 44 can read information that may be necessary from pieces of information stored therein, or write information thereto, on the basis of a control signal from the CPU 46 or the like.

The main storage device 45 stores an execution program read from the auxiliary storage device 44 by the CPU 46 or the like. The main storage device 45 is a read only memory (ROM), a random access memory (RAM), or the like.

The CPU 46 implements each piece of processing by controlling the processing of the computer as a whole, such as various kinds of arithmetic operations, and data input and output to and from each hardware constituent unit, on the basis of a control program such as an operating system (OS) and the execution program stored in the main storage device 45. Various kinds of information or the like that may be necessary during the execution of the program can be obtained from the auxiliary storage device 44, and a result of the execution and the like can be stored in the auxiliary storage device 44.

For example, the CPU 46 executes a program installed in the auxiliary storage device 44 on the basis of an instruction to execute the program which instruction is obtained from the input device 41 or the like, and thereby performs processing corresponding to the program on the main storage device 45. For example, by executing the input control program, the CPU 46 performs processing such as the obtainment of observation data or the like in the above-described data obtaining unit 11, the extraction of the position, height, trajectory, and the like of the pointer by the pointer trajectory extracting unit 12, and the recognition of an operation by the operation recognizing unit 13. In addition, by executing the input control program, the CPU 46 performs processing such as the execution of the app 18-1 by the app executing unit 14, the transmission and reception of data by the communicating unit 15, and data output to the projector 30 or the like by the output unit 16. The contents processed in the CPU 46 are not limited to the above-described contents. The contents executed by the CPU 46 are stored in the auxiliary storage device 44 or the like when desired.

The network coupling device 47 for example performs communication with another external device via a communication network such as the Internet or a LAN. On the basis of a control signal from the CPU 46, the network coupling device 47 is coupled to the communication network or the like, and thereby obtains an execution program, software, setting information, and the like from the external device or the like. In addition, the network coupling device 47 may provide an execution result obtained by executing a program to the external device or the like, or may provide the execution program itself in the present embodiment to the external device or the like.

The recording medium 48 is a computer readable recording medium storing the execution program and the like as described above. The recording medium 48 is for example a portable recording medium such as a semiconductor memory such as a flash memory, a compact disc read only memory (CD-ROM), or a digital versatile disc (DVD). However, the recording medium 48 is not limited to this.

When an execution program (for example the input control program or the like) is installed on the hardware configuration illustrated in FIG. 2, the hardware resources and the software can implement the input control processing or the like in the present embodiment in cooperation with each other.

<Example of Input Control Processing>

Figure 3:
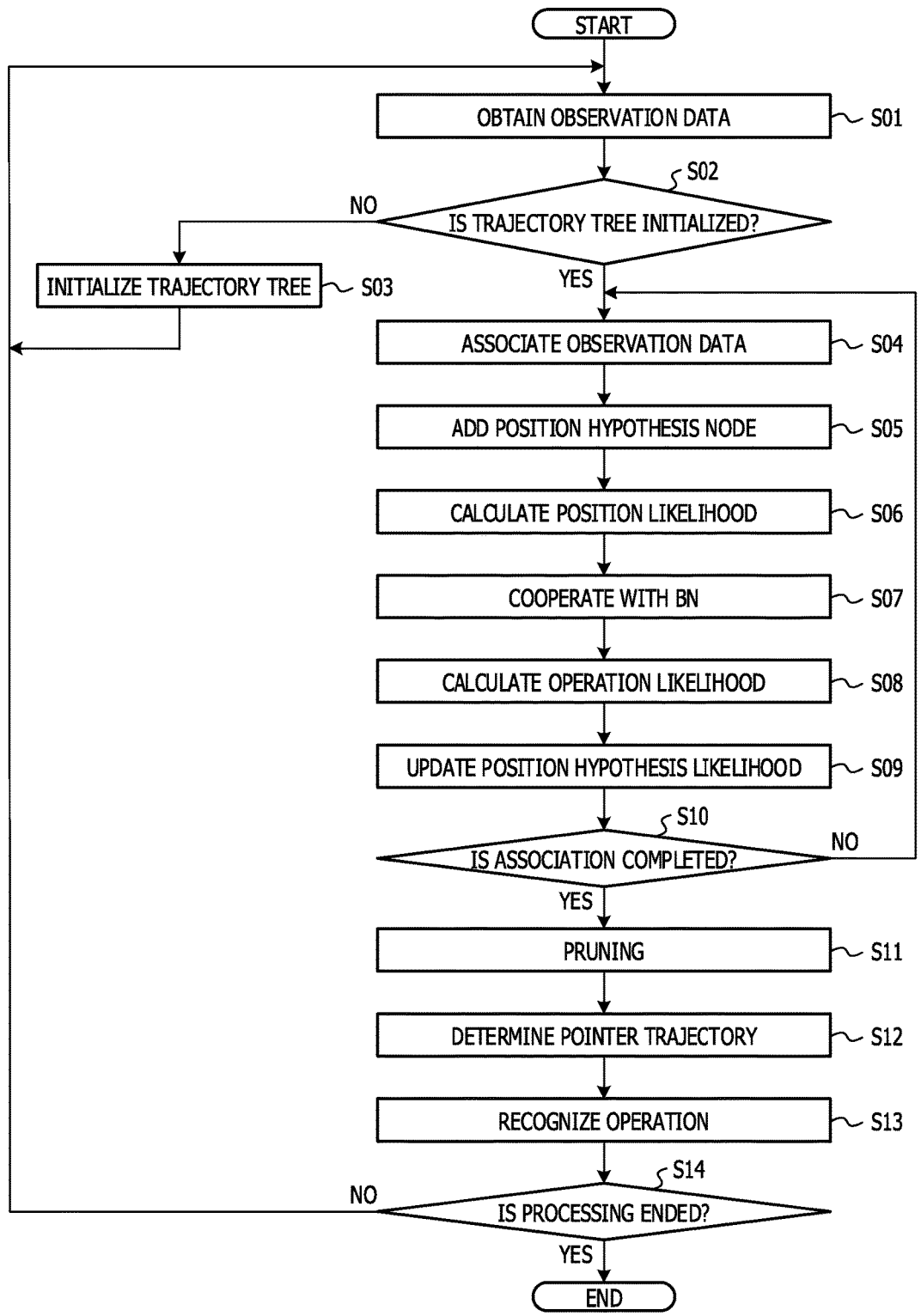
FIG. 3 is a flowchart illustrating an example of input control processing.

An example of input control processing in an information processing device will next be described with reference to a flowchart. FIG. 3 is a flowchart illustrating an example of input control processing. The information processing device described with reference to FIG. 3 may be the information processing device 10 depicted in FIG. 1.

In the example of FIG. 3, the data obtaining unit 11 obtains at least one piece of observation data at each given time through the observing unit 20 (S01). The processing of S01 obtains for example observation data indicating whether or not an LED or the like is illuminating and observation data such as information on the position of the pointer (pointer candidate position) and information on the height of the pointer. However, kinds and the number of pieces of observation data are not limited to this. The processing of S01 obtains position information and operation information by sensing the position and operation of the pointer.

Next, the pointer trajectory extracting unit 12 determines whether or not a trajectory tree as an example of information on the trajectory of the pointer (tracking information) is already initialized (S02). The trajectory tree is for example a tree in which position hypotheses related to pointer candidate positions at each given time set in advance are generated, and the generated position hypotheses are tracked and managed in the form of a tree. When the trajectory tree is not already initialized (NO in S02), the pointer trajectory extracting unit 12 initializes the trajectory tree (S03), and returns to the processing of S01.

When the trajectory tree is already initialized (YES in S02), the pointer trajectory extracting unit 12 associates the observation data obtained in S01 with a pointer candidate position at a previous time (S04). Next, the pointer trajectory extracting unit 12 generates a position hypothesis related to a pointer candidate position at each time, adds a position hypothesis node (S05), and calculates a position likelihood (S06). In the processing of S05 and S06, the position hypothesis related to the pointer candidate position can be made by using the tracking algorithm (MHT) intended for simultaneous tracking of a plurality of pointers, for example, but is not limited to this. In addition, in the processing of S05 and S06, for example, each time a new position hypothesis node is added, the position likelihood is calculated on the basis of the motion model of the pointer which motion model is set in advance.

Next, the pointer trajectory extracting unit 12 cooperates with touch recognition (BN) (S07), and calculates an operation likelihood (S08). In the processing of S07, an operation hypothesis related to a pointer candidate operation is made by using for example a DBN, but is not limited to this.

Next, the pointer trajectory extracting unit 12 updates the position hypothesis likelihood by reflecting each operation, and generates the trajectory tree (S09). In the processing of S09, the position hypothesis likelihood can be updated on the basis of an operation hypothesis likelihood calculated on the basis of a DBN cooperating with each position hypothesis and the likelihood of a parent hypothesis of the tree, for example.

Next, the pointer trajectory extracting unit 12 determines whether or not the association in the processing of S04 is completed (S10). When the association is not completed (NO in S10), the pointer trajectory extracting unit 12 returns to the processing of S04. When the association is completed (YES in S10), the pointer trajectory extracting unit 12 prunes unnecessary nodes on the basis of the position likelihood of each node included in the trajectory tree generated thus far and the like (S11), and determines a final pointer trajectory (S12).

Next, the operation recognizing unit 13 recognizes an operation corresponding to the contents of the pointer trajectory obtained by the processing of S12 (S13). In the processing of S13, processing such as execution of an app may be performed according to the operation as a result of the recognition, but the processing of S13 is not limited to this.

Here, the control unit 17 determines whether or not to end the processing (S14). When the processing is not to be ended (NO in S14), the control unit 17 returns to the processing of S01. When the processing is to be ended according to an instruction of the user or the like in the processing of S14 (YES in S14), the input control processing is ended.

<Outline of Input Control Processing>

Figure 4B:
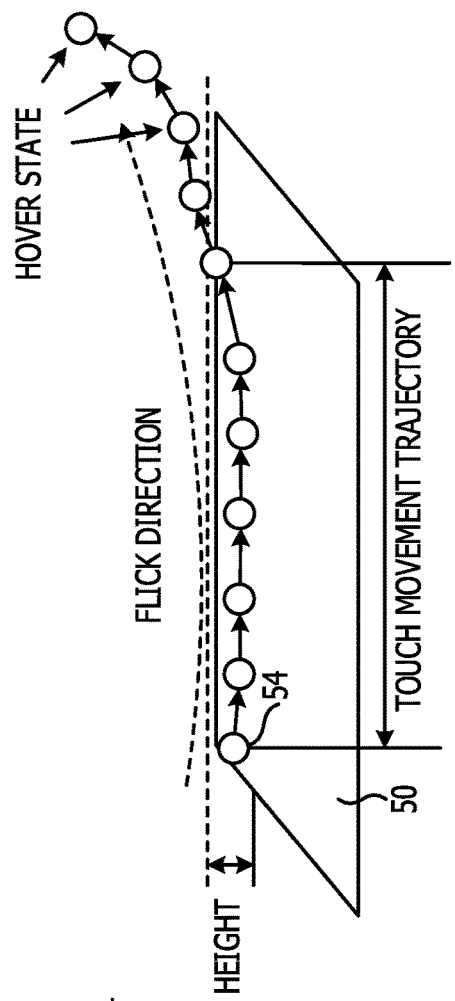
FIGS. 4A and 4B are diagrams of assistance in explaining an outline of input control processing.
Figure 4A:
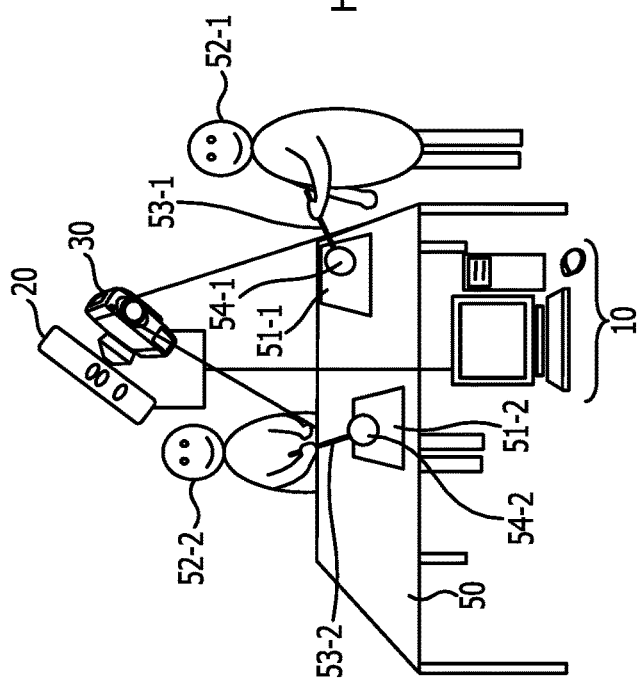

An outline of the above-described input control processing will next be described. FIGS. 4A and 4B are diagrams of assistance in explaining an outline of the input control processing. FIG. 4A illustrates an outline of input operations performed by users. FIG. 4B illustrates a pointer trajectory resulting from an input operation.

The example of FIG. 4A includes the information processing device 10, the observing unit 20, and the projector 30. As illustrated in FIG. 4A, various kinds of image data such as given icons 51-1 and 51-2 are projected from the projector 30 onto a tabletop 50.

For example, in a field of real world interaction, one or a plurality of users 52 use indicating members 53-1 and 53-2 or the like, and move pointers 54-1 and 54-2 present at tip end portions of the indicating members 53-1 and 53-2 to interact with an information world by the positions and operations of the pointers or the like. Here, the positions and the operations represent for example states such as a touch, a drag, a flick and a long depression, but are not limited to this. In such a case, the input states of the respective pointers are determined by tracking the positions and trajectories of the pointers 54-1 and 54-2 operated by the users 52 using the observing unit 20. This enables for example input and output of information in a work site or the like and simultaneous use by a plurality of people.

However, when the input states or the like are to be determined from the information obtained by the observing unit 20, it is difficult to determine the states due to effects of a camera accuracy and a sensor accuracy provided by the observing unit 20. For example, it is difficult to recognize from only video photographed by the RGB camera 20-1 that the input state of the pointer 54 at a given height or more is a hover state according to a height from the tabletop 50 in a touch movement trajectory in a flick direction as illustrated in the example of FIG. 4B. Thus, the input state of the pointer 54 tends to be lost (loss).

Accordingly, in the present embodiment, even in the state as illustrated in FIG. 4B, the accuracy of input of the position of the pointer 54 is improved by more properly extracting the trajectory of the pointer 54 touching the tabletop 50 when recognizing the position of the pointer 54 or a gesture. For example, the present embodiment makes a processing result of pointer tracking by the above-described MHT or the like and a processing result of touch recognition by the DBN cooperate with each other in order to recognize the position and trajectory of the pointer 54, that is, in order to reliably extract the touch movement trajectory without losing the pointer 54 at a time of a touch and without being affected by the pointer 54 at a time of hover.

In the present embodiment, a position hypothesis related to a pointer candidate position at each time is generated from the video of a camera which video is photographed at given time intervals, and each generated position hypothesis is managed in the trajectory tree. In addition, in the present embodiment, for example each position hypothesis updates the likelihood of the position hypothesis itself on the basis of the likelihood of an operation hypothesis cooperating with the position hypothesis itself, and the touch trajectory is determined on the basis of a hypothesis likelihood in which the position hypothesis likelihood and the operation hypothesis likelihood are integrated. Incidentally, when the touch trajectory is to be determined, the pruning of the above-described trajectory tree in given timing (for example at intervals of three hierarchies or the like) can reduce a data volume, and also reduce an amount of processing.

<BN in Pointer Trajectory Extracting Unit>

A BN used for touch recognition in a pointer trajectory extracting unit will be described in the following with reference to a drawing. FIGS. 5A and 5B are diagrams of assistance in explaining a simple BN in a pointer trajectory extracting unit. The pointer trajectory extracting unit described with reference to FIGS. 5A and 5B may be the pointer trajectory extracting unit 12 depicted in FIG. 1. In the example of FIGS. 5A and 5B, an input state is a "cause," the observation data of each sensor is an "effect," and a CPT indicating a probability of the "effect" resulting from the "cause" is set in advance. The pointer trajectory extracting unit 12 probabilistically estimates the "cause" when the "effect" occurs on the basis of the CPT.

A BN for example has events as nodes, and represents a causal relation between events by an arrow. A parameter (CPT) is for example data indicating a probability of an event at the head of an arrow occurring when an event at the back end of the arrow occurs. A probability of the event at the back end of the arrow occurring when the event at the head of the arrow occurs can be estimated by using the CPT.

In addition, estimated probabilities propagate forward one after another in the direction of arrows. Therefore, in the present embodiment, estimation results are allowed to propagate on a time axis by linking nodes at different times to each other using the DBN.

For example, as illustrated in FIG. 5A, observation data from one or a plurality of observing sensors (observing unit 20) is set as $y_1, y_2, \ldots, y_N$ for an input state x of the pointer. Incidentally, in the example of FIG. 5A, the variable of the input state x is binary, with "1" representing a touch and "0" representing a hover as an example, but is not limited to this. In addition, as an example of output of the observation data $y_1, y_2, \ldots, y_N$ an illuminating state of an LED provided to the pointer 54 at the time of the input state is observed, or a state of the height of the pointer being a certain value or more is observed and a prediction of an observation that indicates a touch or a hover is output according to the result, for example. However, examples of output of the observation data $y_1, y_2, \ldots, y_N$ are not limited to this.

In addition, a CPT for each observing sensor can be set as illustrated in FIG. 5B. In the example of FIG. 5B, respective CPTs of the input state x and the touch observation data $y_1, y_2, \ldots, y_N$ are set. It is to be noted that set contents are not limited to the example of FIG. 5B. In addition, a position hypothesis likelihood can be for example obtained from the results of the respective touch observing sensors by $p(x|y_1, y_2, \ldots, y_N) = \eta p(y_1|x) p(y_2|x) \ldots p(y_N|x)$, where $\eta$ is an example of a given control parameter.

Figure 6A:
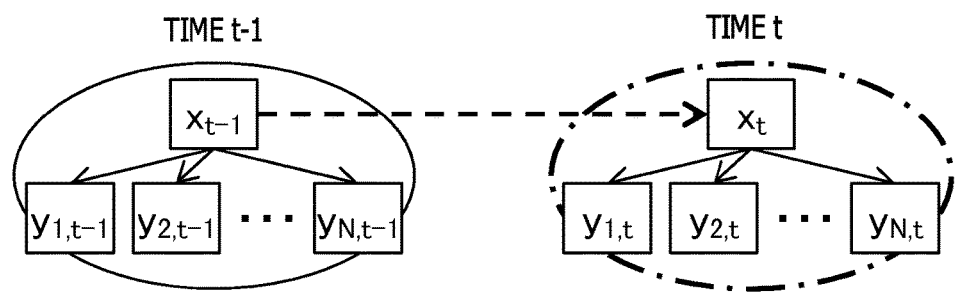
FIGS. 6A and 6B are diagrams illustrating schematic examples of configuration of DBNs.
Figure 6B:
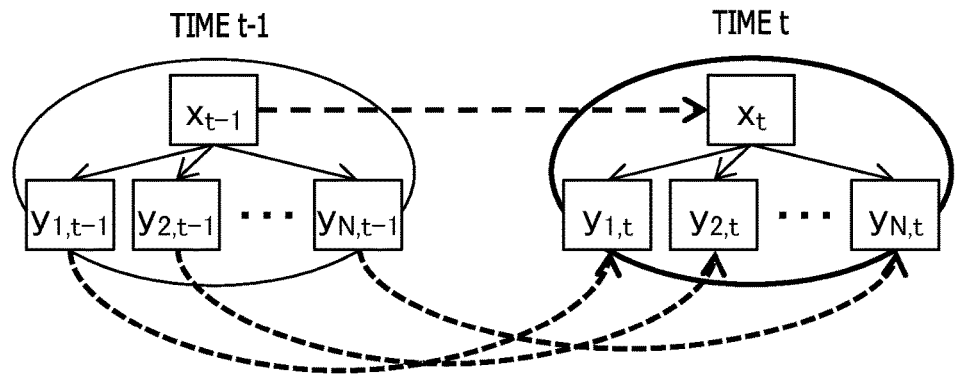

In addition, as opposed to the simple BN illustrated in FIGS. 5A and 5B, two kinds of DBNs can be formed in the present embodiment. FIGS. 6A and 6B are diagrams illustrating schematic examples of configuration of DBNs. In a first example of configuration of a DBN illustrated in FIG. 6A (which DBN will hereinafter be referred to as a "DBN1" when desired), the nodes of input states at adjacent times are linked to each other ($x_{t-1} \rightarrow x_t$). The DBN1 for example estimates a touch on the basis of actual observation data at a present time, and is used in a case where there is actual data ($y_1, y_2, \ldots, y_{N,t}$) of sensors observing the touch (which data will hereinafter be referred to as "observing nodes" when desired).

In a second example of configuration of a DBN illustrated in FIG. 6B (which DBN will hereinafter be referred to as a "DBN2" when desired), input state nodes at adjacent times are linked to each other and sensor observing nodes are linked to each other.

The DBN2 for example estimates a touch on the basis of same observation data as the observation data of a DBN at an immediately preceding time, and is used in a case where there is no actual data $(y_1, y_2, \ldots, y_{N,t})$ of the sensors observing the touch.

<Cooperation between MHT and DBN>

The present embodiment improves input accuracy of the pointer by making the processing results of the MHT and the DBN cooperate with each other. In a case where the cooperation is to be achieved, the MHT is first initialized as illustrated in the above-described processing of S03 in FIG. 3.

Figure 7:
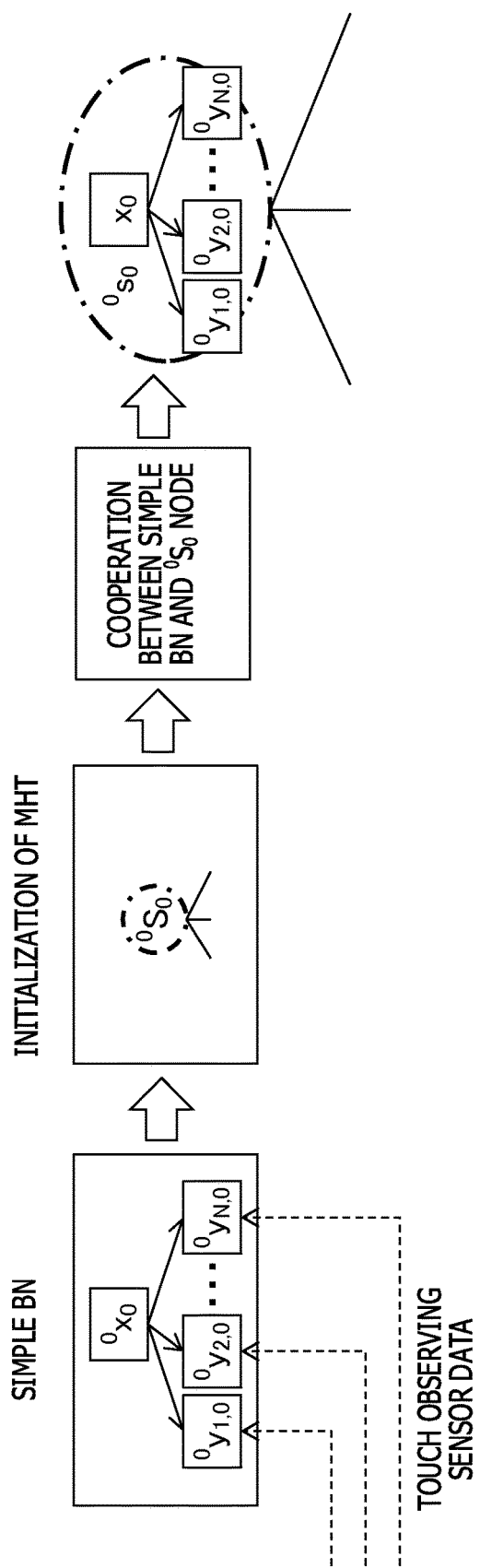
FIG. 7 is a diagram illustrating an example of initialization of MHT.

FIG. 7 is a diagram illustrating an example of initialization of the MHT. In the initialization of the MHT, a pointer position measured by the sensors at time t=0 is initialized ($^0S_0$), and a root node of the MHT is generated. Incidentally, the following description will be made of a case where there is for example one piece of observation data for convenience. In a case of a plurality of pieces of observation data, similar cooperation equal in number to the number of pieces of observation data are performed.

In the initialization of the MHT, as illustrated in FIG. 7, for example, the entity of a simple BN obtained from touch observing sensor data and the root node of the MHT cooperate with each other to generate an input state $^0x_0$ and touch observation data $^0y_{1,0}, ^0y_{2,0}, \ldots, ^0y_{N,0}$. That is, the simple BN is generated within $^0S_0$ by the cooperation between the simple BN and $^0S_0$. A trajectory tree is thereafter generated by the addition of position hypothesis nodes.

<MHT: Example of Addition of Position Hypothesis Nodes>

An example of addition of position hypothesis nodes by the MHT will next be described with reference to a drawing. FIGS. 8A and 8B are diagrams illustrating an example of addition of position hypothesis nodes.

The MHT for example resolves vagueness as to whether observation data obtained from the sensors or the like originates from an object (target) such as the pointer, or is noise, or originates from another pointer. For example, when observation data at time t is assumed to originate from the target in relation to the position of the target at time t−1, the target position is updated from the observation data. In addition, if the observation data is assumed to be noise, the target position is updated by prediction. That is, position hypothesis nodes at time t are generated by the above-described hypotheses (tentative assignment), and tentative assignment is similarly performed at and after time t+1. Thus, the target position is updated, and the trajectory tree is grown. In addition, the position hypotheses generated at each time are managed in the trajectory tree. For example, on the basis of the motion model (for example a uniform motion model or the like) of the target, the target position is updated on the basis of the position hypotheses, and each position hypothesis likelihood (position likelihood) is calculated. In addition, after the trajectory tree grows to a given depth (hierarchy), the trajectory tree is traced back from a node having a maximum position likelihood to the root node, and branches that do not lead to the node having the maximum position likelihood are cut off (pruning processing). This pruning consequently determines the tentative assignment.

For example, in the present embodiment, operation hypothesis likelihoods are obtained for position hypothesis nodes having a plurality of types in advance by using DBNs corresponding to the respective types. For example, three types of MHT position hypothesis nodes, that is, a "touch observation type position hypothesis node: $^0S_1$," a "touch prediction type position hypothesis node: $^1S_1$," and a "hover prediction type position hypothesis node: $^2S_1$," at a certain time t=1 are added as child nodes under a parent node $^0S_0$ at time t=0, as illustrated in FIG. 8A.

For example, in the case of the above-described touch observation type position hypothesis node $^0S_1$ position observation data $y_1$ is regarded as originating from the parent $^0S_0$, and the value of $^0S_0$ is updated by using the observation data. In addition, a position likelihood $p(^0S_1)$ of the position hypothesis node $^0S_1$ is calculated. The position hypothesis node $^0S_1$ for example has the updated position and the updated position likelihood.

For example, in the case of the above-described touch prediction type position hypothesis node $^1S_1$, the position observation data $y_1$ is not regarded as originating from the parent $^0S_0$, but it is simply assumed that the pointer is in a touch state. The value of $^0S_0$ is updated by only prediction on the basis of a motion model of a moving speed and a direction thus far or the like. Further, a position likelihood $p(^1S_1)$ of the node $^1S_1$ is calculated. The node $^1S_1$ has for example the updated position and the updated position likelihood.

For example, in the case of the above-described hover prediction type position hypothesis node $^2S_1$, the position observation data $y_1$ is not regarded as originating from the parent $^0S_0$, but it is simply assumed that the pointer is in a hover state. The value of $^0S_0$ is updated by only prediction on the basis of a motion model of a moving speed and a direction thus far or the like. Further, a position likelihood $p(^2S_1)$ of the node $^2S_1$ is calculated. The node $^2S_1$ for example has the updated position and the updated position likelihood.

Cooperation between the position hypothesis nodes and the DBNs is cooperation as illustrated in FIG. 8B, for example. For example, the position hypothesis nodes ($^0S_1$, $^1S_1$, and $^2S_1$) added at time t=1 cooperate with the DBNs corresponding to the respective position hypothesis nodes (for example the DBN1 and the DBN2 described above).

For example, the touch observation type position hypothesis node $^0S_1$ cooperates using the above-described DBN1 illustrated in FIG. 6A to estimate a touch ((a) in FIG. 8B). In this case, a touch operation hypothesis likelihood (touch operation likelihood) $p(^0x_1=1)$ is estimated (x=1 indicates a touch state as illustrated in FIG. 5A, for example).

For example, the touch prediction type position hypothesis node $^1S_1$ cooperates using the above-described DBN2 illustrated in FIG. 6B to estimate a touch ((b) in FIG. 8B). In this case, a touch operation likelihood $p(^1x_1=1)$ is estimated (x=1 indicates a touch state as illustrated in FIG. 5A, for example).

For example, the hover prediction type position hypothesis node $^2S_1$ cooperates using the above-described DBN2 illustrated in FIG. 6B to estimate a hover ((c) in FIG. 8B). In this case, a hover operation likelihood $p(^2x_1=0)$ is estimated (x=0 indicates a hover state as illustrated in FIG. 5A, for example).

<Example of Calculation of Touch Operation Likelihood $p(^0x_1=1)$>

Figure 9:
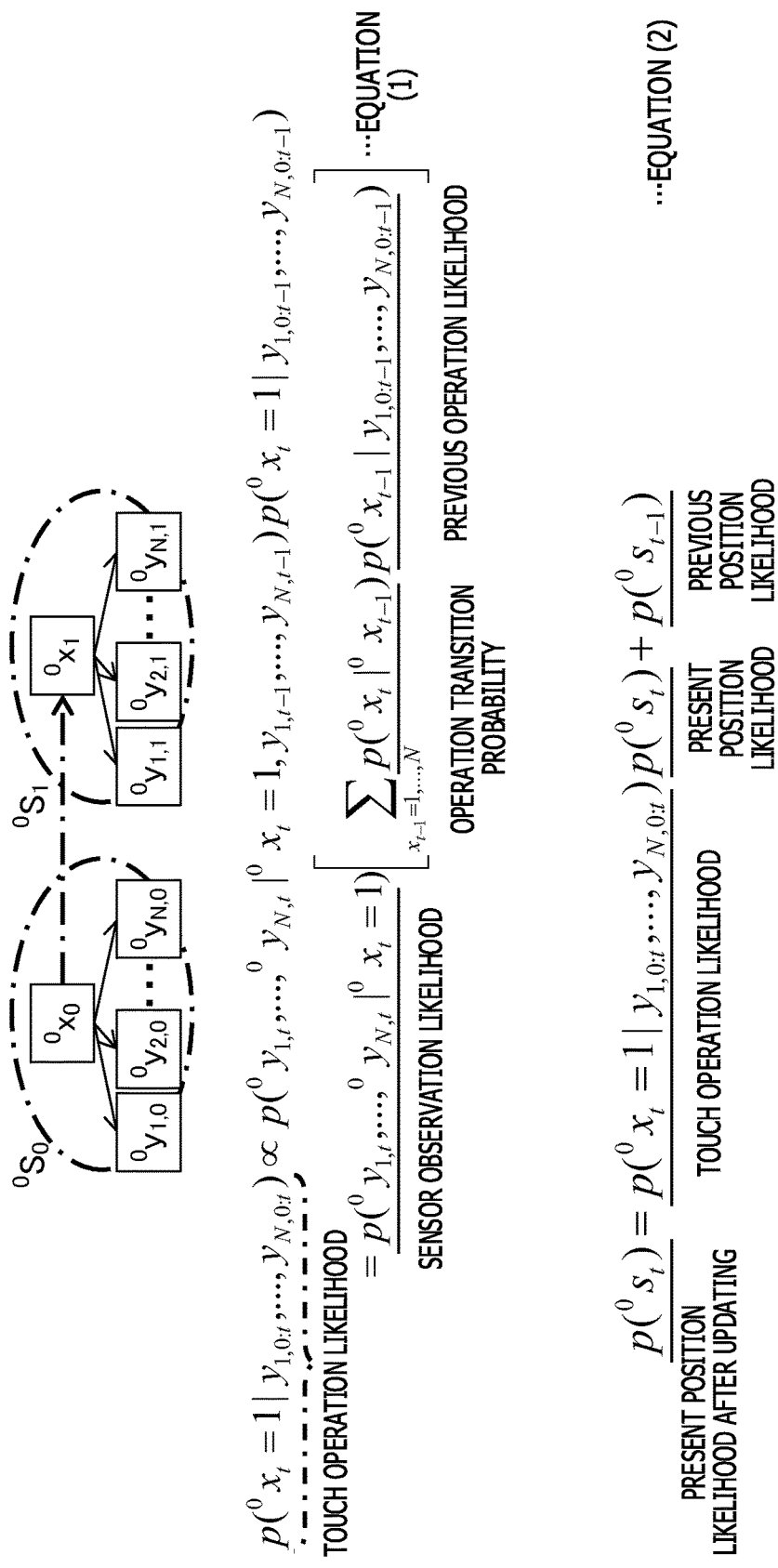
FIG. 9 is a diagram illustrating an example of calculation of a touch operation likelihood $p(^0 x_1=1)$.

An example of calculation of the above-described touch operation likelihood $p(^0x_1=1)$ will next be described with reference to a drawing. FIG. 9 is a diagram illustrating an example of calculation of the touch operation likelihood $p(^0x_1=1)$.

In the example of calculation of the touch operation likelihood $p(^0x_1=1)$, for example, the touch observation type position hypothesis node $^0S_1$ cooperates using the DBN1 illustrated in FIG. 6A, as described above. Incidentally, the actual measured values of the touch observing sensors are used as the values of parameters $^0y_{1,1}, ^0y_{2,1}, \ldots, ^0y_{N,1}$ at the time of the calculation.

For example, the touch operation likelihood $p(^0x_1=1)$ can be obtained by using a sensor observation likelihood, an operation transition probability, and a previous operation likelihood, and can be calculated as represented by Equation (1) in FIG. 9 (where t=1), for example. It is to be noted that examples of calculation of the touch operation likelihood $p(^0x_1=1)$ are not limited to the example of Equation (1).

In addition, a present position likelihood after the update in the touch operation likelihood $p(^0x_1=1)$ can be obtained by using the touch operation likelihood, a present position likelihood, and a previous position likelihood. A calculation as represented by Equation (2) in FIG. 9, for example, is performed to update the position likelihood (where t=1). It is to be noted that examples of calculation of the present position likelihood after the update are not limited to the example of Equation (2).

<Example of Calculation of Touch Operation Likelihood $p(^1x_1=1)$>

An example of calculation of the above-described touch operation likelihood $p(^1x_1=1)$ will next be described with reference to a drawing. FIG. 10 is a diagram illustrating an example of calculation of the touch operation likelihood $p(^1x_1=1)$.

In the example of calculation of the touch operation likelihood $p(^1x_1=1)$, the touch prediction type position hypothesis node $^1S_1$ cooperates using the DBN2 illustrated in FIG. 6B, as described above. Incidentally, data $^0y_{1,0}, \ldots, ^0y_{N,0}$ at the previous time is copied and used as parameters $^1y_{1,1}, \ldots, ^1y_{N,1}$ at the time of the calculation. As another method, most frequent observation data thus far may be used.

For example, the touch operation likelihood $p(^1x_1=1)$ can be obtained by using a sensor observation likelihood, an operation transition probability, and the previous operation likelihood, and can be calculated as represented by Equation (3) in FIG. 10 (where t=1), for example. It is to be noted that examples of calculation of the touch operation likelihood $p(^1x_1=1)$ are not limited to the example of Equation (3).

In addition, a present position likelihood after the update in the touch operation likelihood $p(^1x_1=1)$ can be obtained by using the touch operation likelihood, a present position likelihood, and the previous position likelihood. A calculation as represented by Equation (4) in FIG. 10, for example, is performed to update the position likelihood (where t=1). It is to be noted that examples of calculation of the present position likelihood after the update are not limited to the example of Equation (4).

<Example of Calculation of Hover Operation Likelihood $p(^2x_1=0)$>

An example of calculation of the above-described hover operation likelihood $p(^2x_1=0)$ will next be described with reference to a drawing. FIG. 11 is a diagram illustrating an example of calculation of the hover operation likelihood $p(^2x_1=0)$.

In the example of calculation of the hover operation likelihood $p(^2x_1=0)$, the hover prediction type position hypothesis node $^2S_1$ cooperates using the DBN2 illustrated in FIG. 6B, as described above. Incidentally, data $^0y_{1,0}, \ldots, ^0y_{N,0}$ at the previous time is copied and used as parameters $^2y_{1,1}, \ldots, ^2y_{N,1}$ at the time of the calculation. As another method, most frequent observation data thus far may be used.

For example, the hover operation likelihood $p(^2x_1=0)$ can be obtained by using a sensor observation likelihood, an operation transition probability, and the previous operation likelihood, and can be calculated as represented by Equation (5) illustrated in FIG. 11 (where t=1), for example. It is to be noted that examples of calculation of the hover operation likelihood $p(^2x_1=0)$ are not limited to the example of Equation (5).

In addition, a present position likelihood after the update in the hover operation likelihood $p(^2x_1=0)$ can be obtained by using the hover operation likelihood, a present position likelihood, and the previous position likelihood. A calculation as represented by Equation (6) in FIG. 11, for example, is performed to update the position likelihood (where t=1). It is to be noted that examples of calculation of the present position likelihood after the update are not limited to the example of Equation (6).

Incidentally, the above-described example has been illustrated as an example of addition of position hypothesis nodes when a transition is made from time t=0 to t=1. Also at each of time t=2 and subsequent times, position hypothesis nodes are added, and the trajectory tree is generated.

<Example of Generation of Trajectory Tree>

An example of generation of the trajectory tree (position hypothesis tree) in the present embodiment will next be described with reference to a drawing. FIGS. 12A and 12B are diagrams illustrating an example of generation of the trajectory tree. Incidentally, the generation of the trajectory tree represents an example of generation of a tree in a case where time is 1 or more, for example.

For example, at time t>1, in a case where the parent node is for example a touch observation type position hypothesis node $^0s_{t-1}$, as at t=1, as described above, three position hypothesis nodes ($^0S_t$, $^1S_t$, and $^2S_t$) are added, then the pointer position is updated, and position likelihoods are calculated. In addition, operation likelihoods are calculated on the basis of the respective DBNs cooperating with the position hypothesis nodes ($^0S_t$, $^1S_t$, and $^2S_t$), and then the position likelihoods are updated.

In addition, at time t>1, in a case where the parent node is for example a touch prediction type position hypothesis node $^1S_{t-1}$, the above-described three position hypothesis nodes ($^0S_t$, $^1S_t$, and $^2S_t$) are added as illustrated in FIG. 12A.

In addition, at time t>1, in a case where the parent node is for example a hover prediction type position hypothesis node $^2S_{t-1}$, new child nodes are not added, as illustrated in FIG. 12B.

<Example of Pruning (Selection and Deletion) of Trajectory Tree>

Figure 13:
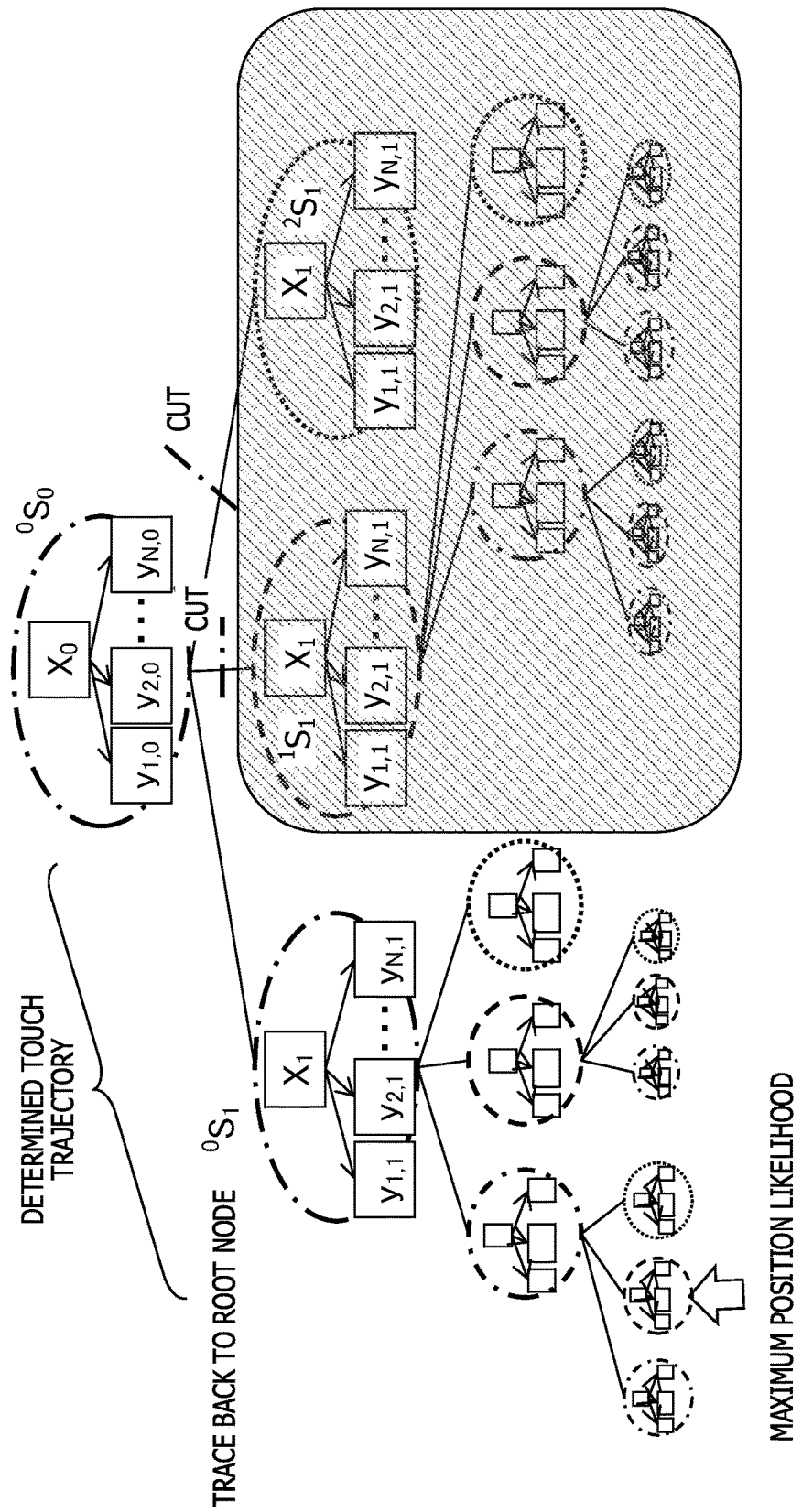
FIG. 13 is a diagram illustrating an example of pruning of a trajectory tree.

An example of pruning (selection and deletion) of the trajectory tree in the present embodiment will next be described with reference to a drawing. FIG. 13 is a diagram illustrating an example of pruning of the trajectory tree. In the pruning of the trajectory tree in the present embodiment, when the depth of the tree has become given hierarchies (three hierarchies) or more, as illustrated in FIG. 13, a node having a maximum position likelihood which node is present as a terminal leaf is first selected. Next, tracing is performed from the selected node to the root node. Then, branches to other nodes that are directly under the root node and which do not lead to the node having the maximum position likelihood are cut off. In the example of FIG. 13, a part enclosed in a hatched region is cut off. The cooperation of the cut-off branches with DBNs is cancelled, and the DBNs are deleted. Thus, in the example of FIG. 13, a path from $^0S_0$ to $^0S_1$ is determined as a touch trajectory.

In the present embodiment, as a method of generating the above-described trajectory tree, new position hypotheses are generated each time data from the observing sensors or the like is input, and the tree as a whole (position hypothesis tree) is grown by adding each of the new position hypotheses as a node of the tree to a parent position hypothesis node. Thus, the trajectory tree can be generated. In addition, as a method of determining a touch movement trajectory, a touch movement trajectory is determined by performing pruning on the basis of position hypothesis likelihoods, operation hypothesis likelihoods, and the likelihood of the parent hypothesis, and operation hypotheses cooperating with deleted position hypotheses are deleted. This can reduce an amount of data, and can reduce an amount of processing.

<Example of Definition of Pointer Operation (Touch, Hover, or the Like)>

Figure 14:
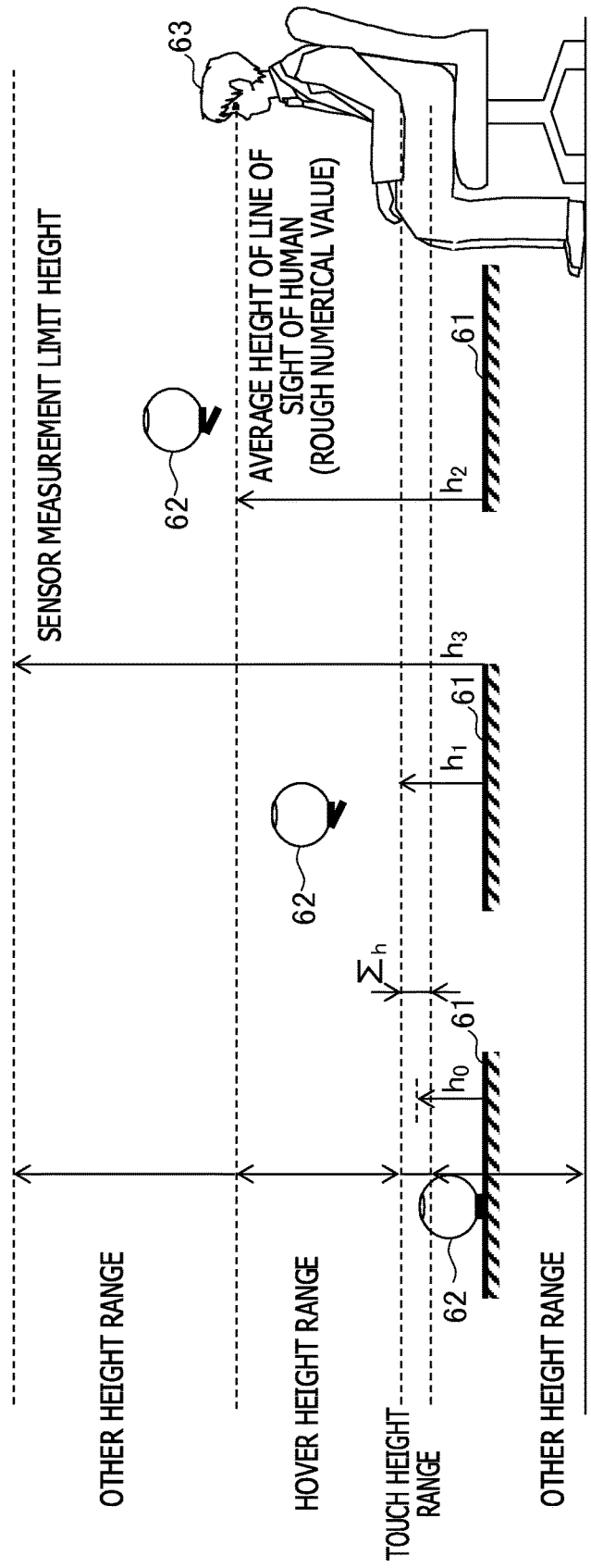
FIG. 14 is a diagram illustrating an example of definition of pointer operation.

An example of definition of pointer operation (touch, hover, or the like) will be concretely described in the following with reference to a drawing. FIG. 14 is a diagram illustrating an example of definition of pointer operation. It is to be noted that definition contents are not limited to FIG. 14. For example, in the example of FIG. 14, a touch height range, a hover height range, and another height range are defined for the position of a ball pointer 62 from a tabletop 61. The ball pointer 62 is an example of a pointer device as an object from which to obtain observation data. However, the pointer device as an object from which to obtain observation data is not limited to the ball pointer 62.

In the example of FIG. 14, the touch height range is set to be within a given vertical range ($\Sigma_h$ in FIG. 14) of an average height $h_0$ (diameter of the ball pointer 62). In addition, the hover height range is set to be a range above the touch height range ($h_1$) and below a line of sight ($h_2$) of a user 63. In addition, the other height range is set to be within a sensor measurement limit height $h_3$. A pointer operation can be grasped more properly by thus defining each of the height ranges in advance, and predicting a state on the basis of a result of observation data.

<Concrete Example of Observation Data and Parameters (CPT)>

Figure 15A:
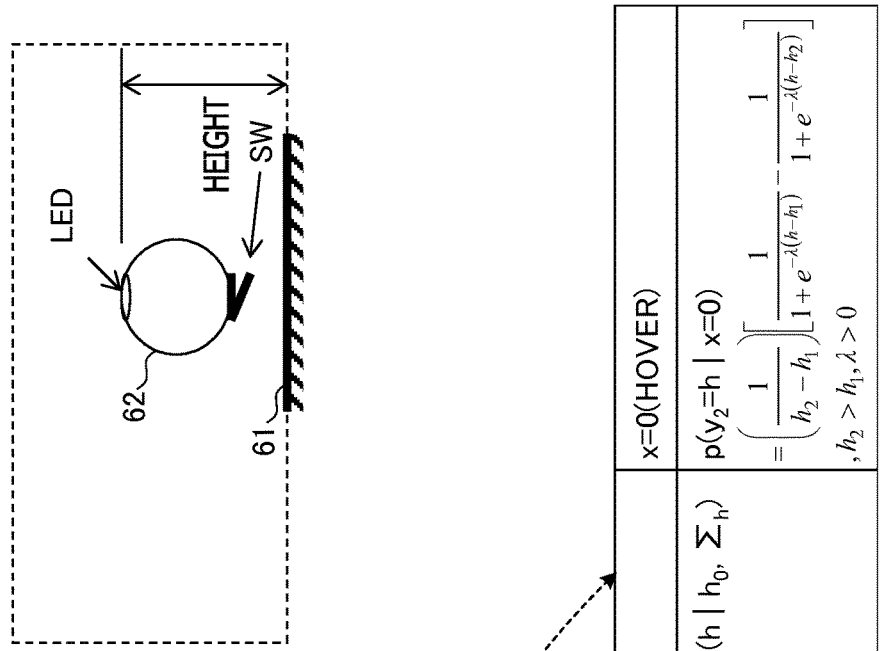
FIGS. 15A and 15B are diagrams illustrating a concrete example of observation data and parameters.
Figure 15B:
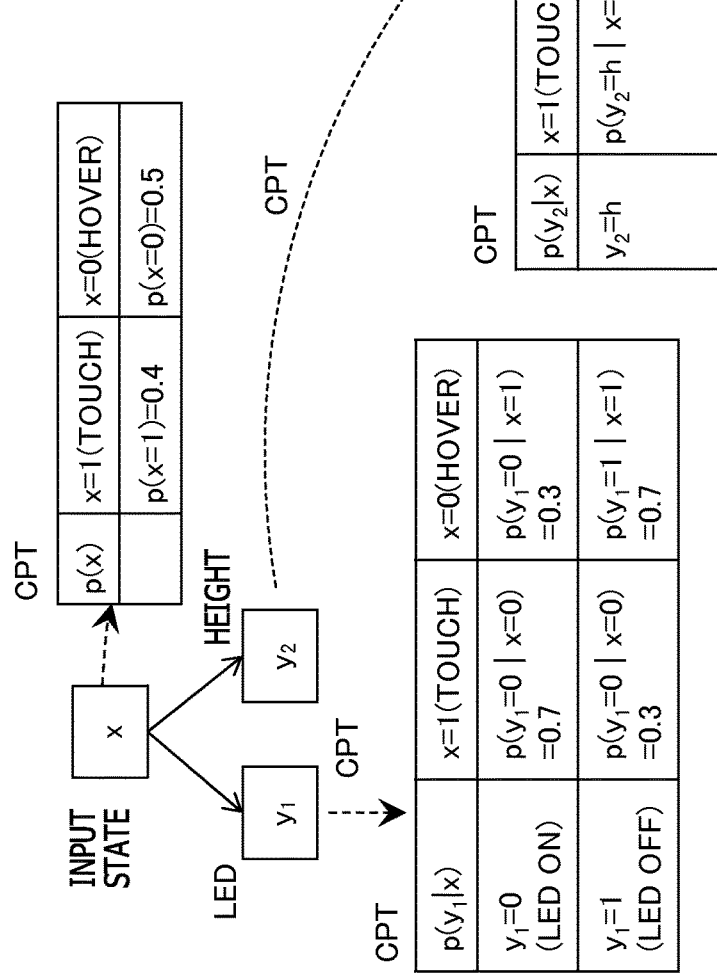

A concrete example of observation data and parameters (CPT) will next be described with reference to a drawing. FIGS. 15A and 15B are diagrams illustrating a concrete example of observation data and parameters. It is to be noted that while the following description will be made of a ball pointer 62 with a built-in LED as illustrated in FIG. 15A as an example of a pointer device as an object from which to obtain observation data, the present embodiment is not limited to the ball pointer 62, but for example a finger of a user or the like or another pointer device may be used.

As illustrated in FIG. 15A, the ball pointer 62 has a switch (SW) in a lower portion thereof, and has an LED as an example of a light emitting unit in an upper portion thereof. The SW of the ball pointer 62 is turned on when the lower portion of the ball pointer 62 comes into contact with an object such for example as a tabletop 61. The SW is off when the lower portion of the ball pointer 62 is not in contact with an object. The LED in the upper portion illuminates in a given color when the SW is on. The LED is in an off state when the SW is off. The ball pointer 62 may be provided to the tip end portion of an indicating member operated by the user.

By using the ball pointer 62 as described above, information on the on/off state and color of the LED and information on the height of the ball pointer 62 can be obtained as observation data. Incidentally, the information on the on/off state and color of the LED can be obtained by the RGB camera 20-1 or the like, and the height of the ball pointer 62 can be obtained by the depth camera 20-2 or the like.

In addition, by comparing each piece of obtained observation data with the parameters (CPT) illustrated in FIG. 15B, a position hypothesis likelihood reflecting each operation and associated with a position hypothesis is determined from the position hypothesis related to a pointer candidate position. It is to be noted that while in the example of FIG. 15B, CPTs are each set, the CPTs being a CPT for predicting the state of a touch or a hover corresponding to the on state or off state of the LED, a CPT for predicting the state of a touch or a hover corresponding to the height h, and a CPT for an input state (a touch or a hover), the CPTs are not limited to this. Incidentally, $h_0$ to $h_2$ and $\Sigma_h$ in the CPT for the height h are similar to the $h_0$ to $h_2$ and $\Sigma_h$ illustrated in FIG. 14, and $\lambda$ is an example of a control parameter. Numerical values within the CPTs may be obtained by learning, or may be set empirically.

Figure 16:
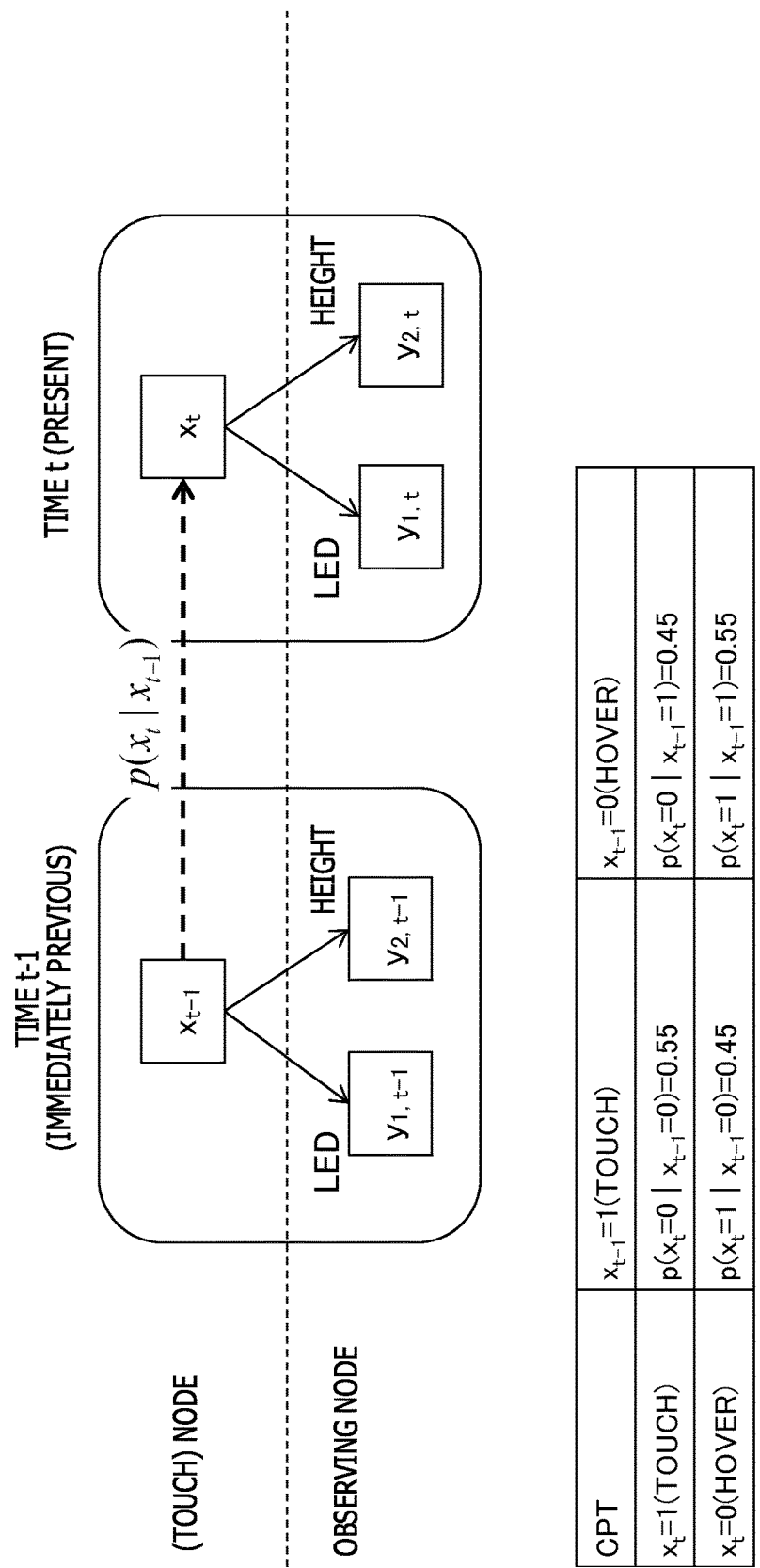
FIG. 16 is a diagram illustrating an example of a touch DBN structure and parameters.

FIG. 16 is a diagram illustrating an example of a touch DBN structure and parameters. The example of FIG. 16 illustrates an input state ((touch) node) and observing nodes at time t−1 (immediately previous) and an input state ((touch) node) and observing nodes at time t (present). In addition, observation data from the observing nodes in FIG. 16 represents for example the on state or off state of the LED possessed by the above-described ball pointer 62 and the height of the ball pointer 62, but is not limited to this.

In the present embodiment, as illustrated in FIG. 16, the parameters (CPT) of input states corresponding to touch DBNs at the immediately previous time and the present time are set. A position hypothesis likelihood and an operation hypothesis likelihood reflecting each operation at each time and associated with a position hypothesis are determined accordingly. In addition, accuracy of input using the pointer can be improved by determining the input state of the pointer on the basis of the position hypothesis likelihood and the operation hypothesis likelihood.

<Case of Plurality of Pieces of Observation Data from Same Sensor>

Figure 17A:
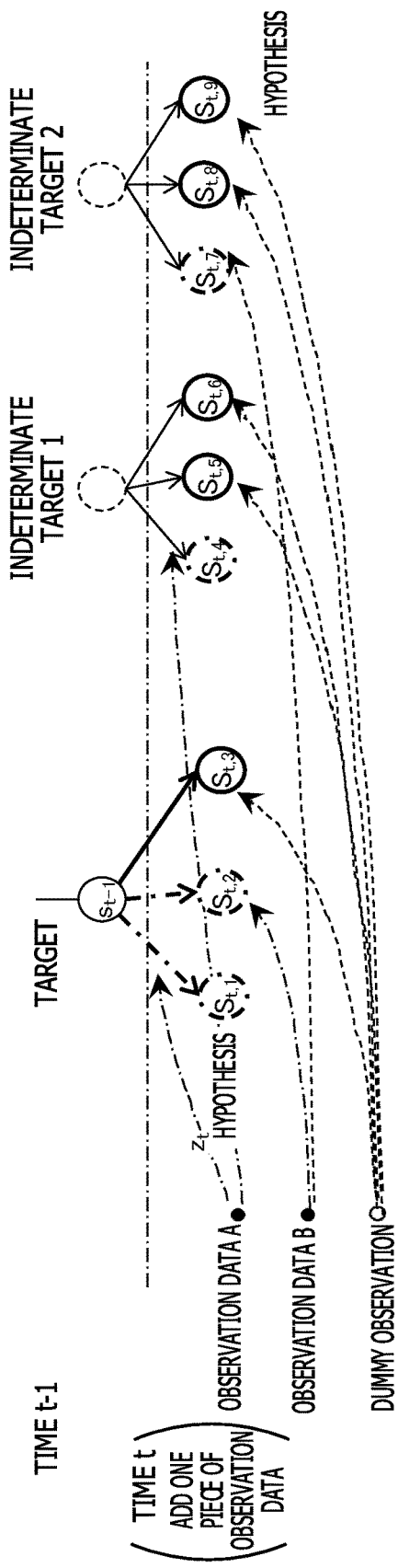

When a plurality of users move respective pointers, for example, a plurality of pieces of observation data are obtained from a same sensor. The present embodiment can improve accuracy of input of each pointer even in the case of the plurality of pieces of observation data. FIGS. 17A and 17B and FIG. 18 are diagrams (1) and (2) illustrating an example of hypotheses in a case of a plurality of pointers.

For example, as illustrated in FIG. 17A, when pieces of observation data A and B are obtained from a same sensor at time t, the pointer trajectory extracting unit 12 adds one piece of dummy observation data, assumes that there are indeterminate targets (pointers) 1 and 2 as opposed to a target (pointer) at time t−1, and assigns the hypotheses of three position hypothesis nodes to each of the plurality of pieces of observation data.

Next, for the assigned hypotheses $S_{t,1}$ to $S_{t,9}$ of the position hypothesis nodes illustrated in FIG. 17A, the pointer trajectory extracting unit 12 calculates the likelihoods of the respective assigned hypotheses $S_{t,1}$ to $S_{t,9}$ using an assigned hypothesis table set in advance as illustrated in FIG. 17B. In the example of FIG. 17B, calculation based on a given motion model (for example a uniform motion model) is performed for the position hypothesis nodes $S_{t,1}$ to $S_{t,3}$, and for the position hypothesis nodes $S_{t,4}$ to $S_{t,9}$, the likelihoods of the hypotheses are obtained using a constant set in advance. However, the calculation of the likelihoods of the hypotheses is not limited to this.

In addition, the pointer trajectory extracting unit 12 converts the likelihoods $p(S_{t,1})$ to $p(S_{t,9})$ of the hypotheses in the assigned hypothesis table illustrated in FIG. 17B into a matrix as illustrated in FIG. 18. The matrix illustrated in FIG. 18 includes for example the "target," the "indeterminate target 1," and the "indeterminate target 2" as well as the "observation data A," the "observation data B," "dummy observation (error alarm)," and "dummy observation." The dummy observation (error alarm) for example represents observation data (signal) generated from noise or the like, and not from the target. The dummy observation represents for example observation data (signal) assigned when it is difficult to observe the target.

The pointer trajectory extracting unit 12 selects a combination of hypothesis likelihoods whose sum is largest from the converted matrix. However, combinations are desirably made under a condition of one-to-one correspondence of rows and columns. For example, in the example of FIG. 18, a sum of one selected from among the hypothesis likelihoods $p(S_{t,1})$ to $p(S_{t,3})$ included in the "target" and one selected from among the hypothesis likelihoods $p(S_{t,4})$ to $p(S_{t,6})$ included in the "indeterminate target 1" is calculated. In addition, for example, a sum of one selected from among the hypothesis likelihoods $p(S_{t,1})$ to $p(S_{t,3})$ included in the "target" and one selected from among the hypothesis likelihoods $p(S_{t,7})$ to $p(S_{t,9})$ included in the "indeterminate target 2" may be calculated. In addition, for example, a sum of one selected from among the hypothesis likelihoods $p(S_{t,4})$ to $p(S_{t,6})$ included in the "indeterminate target 1" and one selected from among the hypothesis likelihoods $p(S_{t,7})$ to $p(S_{t,9})$ included in the "indeterminate target 2" may be calculated. Incidentally, in the present embodiment, only calculations for combinations set in advance may be performed, and a combination whose sum is largest may be selected.

In addition, a pointer (target) trajectory is updated in association with the selected combination, and processing as described above is performed at each time. Thus, even when there are a plurality of pieces of observation data, each pointer trajectory can be extracted properly, and accuracy of operation recognition can be improved.

As described above, according to the present embodiment, accuracy of input using the pointer can be improved. For example, in the present embodiment, a tracking algorithm (MHT) intended for simultaneous tracking of a plurality of pointers is made to cooperate with a DBN that probabilistically recognizes pointer operation. Thus, the likelihood of a hypothesis generated in a data associating stage of the MHT is evaluated by two kinds of hypotheses, that is, the position hypothesis and the operation hypothesis. In addition, in the present embodiment, pruning (for example selection and deletion or the like) of hypotheses is performed on the basis of the likelihood evaluated by the position hypothesis and the operation hypothesis. A movement trajectory is consequently determined.

In addition, in the present embodiment, positional accuracy of the pointer is improved by using the position hypothesis and the operation hypothesis. For example, the position hypothesis is generated by the association of the observation data of sensors with a pointer candidate position at a previous time. The hypothesis that assumes how the pointer on a hypothesis position is operating is made to cooperate with the position hypothesis.

In addition, a hypothesis about an end of extension of the touch movement trajectory is made. In addition, as calculation of a hypothesis likelihood, each time a new position hypothesis node is added, a position hypothesis likelihood (position likelihood) is calculated on the basis of a motion model (for example a uniform motion model) of the pointer which motion model is set in advance. This likelihood is updated on the basis of an operation hypothesis likelihood calculated on the basis of a DBN associated with each position hypothesis and the likelihood of a parent hypothesis. Thus, sensitive threshold value processing or the like becomes unnecessary. In addition, a plurality of touch trajectories can be extracted simultaneously without a delay.

In addition, in the present embodiment, recognition of touch operation of the pointer and the pointer tracking method are made to cooperate with each other. Thus, for example individual settings of criteria for recognizing touch operation are rendered unnecessary, and tuning operation by the user or the like can be reduced. In addition, in the present embodiment described above, a touch state or a hover state is determined as an input state. However, the kind of the input state is not limited to the touch state and the hover state.

Embodiments have been described above in detail. However, the present technology is not limited to particular embodiments, but is susceptible of various modifications and changes within the scope described in claims. In addition, a part or the whole of the foregoing embodiments can be combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing method comprising:
storing sequential data relating to movements of a target object over a specified plane;
generating a position hypothesis related to a candidate position of the target object at each sequential time point based on the stored sequential data;
sequentially estimating a plurality of first likelihoods of a position of the target object in a direction of the specified plane based on the sequential data, each of the plurality of first likelihoods being associated with a generated position hypothesis;
sequentially estimating a plurality of second likelihoods of touch of the target object on the specified plane based on the sequential data, each of the plurality of second likelihoods corresponding to one of the plurality of first likelihoods;
updating the plurality of first likelihoods based on the plurality of second likelihoods; and
determining a position of the target object in the direction of the specified plane based on the updated plurality of first likelihoods.

2. The information processing method according to claim 1, wherein
the plurality of first likelihoods are estimated based on Multiple Hypothesis Tracking (MHT).

3. The information processing method according to claim 2, wherein a tree of MHT is generated by adding a plurality of nodes each corresponding to each hypothesis on the movements in a Tth timing to a node corresponding to a hypothesis on the movements in a T−1th timing.

4. The information processing method according to claim 3, the tree is pruned for each specified hierarchy based on each hypothesis on the movements.

5. The information processing method according to claim 3, wherein
the plurality of nodes each corresponding to each hypothesis on the movements includes a first node, a second node, and a third node,
the first node corresponds to a first hypothesis on the movements under which the target object touches on the specified plane and which a corresponding first likelihood is estimated using the sequential data in Tth timing,
the second node corresponds to a second hypothesis on the movements under which the target object touches on the specified plane and which a corresponding first likelihood is estimated without using the sequential data in Tth timing, and
the first node corresponds to a first hypothesis on the movements under which the target object does not touch on the specified plane and which a corresponding first likelihood is estimated without using the sequential data in Tth timing.

6. The information processing method according to claim 1, wherein the plurality of second likelihoods are estimated based on Dynamic Bayesian Network (DBN).

7. The information processing method according to claim 6, wherein
the plurality of second likelihoods is estimated based on a plurality of DBNs each corresponding to each type of each hypothesis on the movements.

8. The information processing method according to claim 1, wherein
the plurality of first likelihoods is estimated based on a specified movement model of the target object.

9. The information processing method according to claim 1, further comprising:
determining whether the target object touches to the specified plane or not based on the plurality of second likelihoods.

10. An information processing apparatus comprising:
a memory configured to store sequential data relating to movements of a target object over a specified plane; and
a processor coupled to the memory and configured to:
generate a position hypothesis related to a candidate position of the target object at each sequential time point based on the stored sequential data;
sequentially estimate a plurality of first likelihoods of a position of the target object in a direction of the specified plane based on the sequential data, each of the plurality of first likelihoods being associated with a generated position hypothesis,
sequentially estimate a plurality of second likelihoods of touch of the target object on the specified plane based on the sequential data, each of the plurality of second likelihoods corresponding to one of the plurality of first likelihoods;
updating the plurality of first likelihoods based on the plurality of second likelihoods; and
determining a position of the target object in the direction of the specified plane based on the updated plurality of first likelihoods.

11. A non-transitory computer-readable storage medium storing a program that causes a computer to execute a process, the computer including a memory, the process comprising:
storing sequential data relating to movements of a target object over a specified plane;
generating a position hypothesis related to a candidate position of the target object at each sequential time point based on the stored sequential data;
sequentially estimating a plurality of first likelihoods of a position of the target object in a direction of the specified plane based on the sequential data, each of the plurality of first likelihoods being associated with a generated position hypothesis;
sequentially estimating a plurality of second likelihoods of touch of the target object on the specified plane based on the sequential data, each of the plurality of second likelihoods corresponding to one of the plurality of first likelihoods;
updating the plurality of first likelihoods based on the plurality of second likelihoods; and
determining a position of the target object in the direction of the specified plane based on the updated plurality of first likelihoods.

* * * * *